US012687509B2

(12) United States Patent
Hyde et al.

(10) Patent No.: US 12,687,509 B2
(45) Date of Patent: Jul. 21, 2026

(54) LIVE CHEMICAL IMAGING WITH MULTIPLE DETECTORS

(71) Applicant: Oxford Instruments Nanotechnology Tools Limited, High Wycombe (GB)

(72) Inventors: Anthony Hyde, Abingdon (GB); Peter Stratham, Abingdon (GB); Philippe Pinard, Abingdon (GB); Simon Burgess, Abingdon (GB); Haithem Mansour, Abingdon (GB)

(73) Assignee: OXFORD INSTRUMENTS NANOTECHNOLOGY TOOLS LIMITED, High Wycombe (GB)

( * ) Notice: Subject to any disclaimer, the term of this patent is extended or adjusted under 35 U.S.C. 154(b) by 282 days.

(21) Appl. No.: 18/408,347

(22) Filed: Jan. 9, 2024

(65) Prior Publication Data

US 2024/0241068 A1 Jul. 18, 2024

(30) Foreign Application Priority Data

Jan. 13, 2023 (GB) ..................................... 2300537

(51) Int. Cl.
*G01N 23/2252* (2018.01)

(52) U.S. Cl.
CPC ... *G01N 23/2252* (2013.01); *G01N 2223/401* (2013.01)

(58) Field of Classification Search
CPC ............. G01N 23/083; G01N 23/2206; G01N 23/2208; G01N 23/2251; G01N 23/2252;
(Continued)

(56) References Cited

U.S. PATENT DOCUMENTS 3,924,126 A * 12/1975 Anderson ............. H01J 37/295
250/311
5,525,806 A * 6/1996 Iwasaki .................... G01N 1/32
250/311
(Continued)

FOREIGN PATENT DOCUMENTS

EP 2282197 A2 9/2011
WO 2012110754 A1 8/2012
(Continued)

OTHER PUBLICATIONS

Microsemic MSL-OEM Catalogues, pp. 2-13, http://79.170.44.80/micronsemiconductor.co.uk/wp-content/uploads/2017/03/MSL-OEM-Catalogues.pdf.
(Continued)

*Primary Examiner* — Jason L Mccormack
(74) *Attorney, Agent, or Firm* — Blank Rome LLP

(57) ABSTRACT

A method for analysing a specimen in a microscope is provided. The method comprises: acquiring a series of compound image frames using an electron detector, a first X-ray detector, and a second X-ray detector, wherein the first X-ray detector is positioned between the specimen and an electron beam source from which a focused electron beam emerges towards the specimen, and is provided with a filter member interposed between the first X-ray detector and the specimen and adapted to reduce the incidence of electrons on the first X-ray detector, wherein the second X-ray detector is provided with a deflector arrangement configured to reduce the incidence of electrons on the second X-ray detector, and wherein acquiring a compound image frame comprises: causing the focused electron beam to traverse a region of the specimen; monitoring a set of resulting electrons emitted from a plurality of locations within the region
(Continued)

of the specimen, using the electron detector, so as to obtain a first image frame, the first image frame comprising a plurality of pixels corresponding to, and having values derived from the monitored electrons emitted from, the plurality of locations; monitoring first and second sets of resulting X-rays emitted from the plurality of locations using the first X-ray detector and the second X-ray detector respectively, so as to obtain one or more second image frames, each comprising a plurality of pixels corresponding to the plurality of locations and having values derived, in accordance with a first criterion, from monitored X rays characteristic of a respective chemical element and emitted from the plurality of locations, wherein the set of electrons and the first and second sets of X-rays are emitted from the specimen substantially simultaneously; and combining the first image frame and the one or more second image frames so as to produce the compound image frame, such that the compound image frame provides data derived from monitored electrons and X-rays emitted from the plurality of locations within the region, and displaying the series of compound image frames on a visual display, wherein the visual display is updated to show each compound image frame in sequence. A system for analysing a specimen in a microscope is also provided.

20 Claims, 7 Drawing Sheets

(58) Field of Classification Search
CPC ..... G01N 2223/079; G01N 2223/1016; G01N 2223/401; G01N 2223/402; G01N 2223/408; G01N 2223/418; G01N 2223/501; H01J 37/00; H01J 37/02; H01J 37/26; H01J 37/28; H01J 37/222; H01J 37/244; H01J 2237/2445; H01J 2237/24475; H01J 2237/24485; H01J 2237/24495
USPC .................................. 250/306, 307, 310, 311
See application file for complete search history.

(56) References Cited

U.S. PATENT DOCUMENTS

| | | | |
|---|---|---|---|
| 6,996,492 | B1 | 2/2006 | Testoni |
| 8,049,182 | B2 | 11/2011 | Bewick |
| 11,145,487 | B2 | 10/2021 | Li |
| 2011/0168887 | A1 | 7/2011 | Benwick |
| 2013/0054153 | A1 | 2/2013 | Motel et al. |
| 2015/0213995 | A1* | 7/2015 | Muray .................... H01J 37/05 250/311 |
| 2019/0311881 | A1* | 10/2019 | Lavely .................... H01J 37/28 |
| 2021/0151287 | A1 | 5/2021 | Hyde et al. |
| 2023/0003675 | A1 | 1/2023 | Kaplenko et al. |
| 2024/0339293 | A1* | 10/2024 | Statham ................ H01J 37/265 |

FOREIGN PATENT DOCUMENTS

| | | |
|---|---|---|
| WO | 2014202608 A1 | 12/2014 |
| WO | 2019016559 A1 | 1/2019 |
| WO | 2022008924 A1 | 1/2022 |
| WO | 2023002226 A1 | 1/2023 |

OTHER PUBLICATIONS

Wikipedia, Scanning electron microscope, retrieved from https://en.wikipedia.org/wiki/Scanning_electron_microscope#Detection_of_backscattered_electrons, Feb. 4, 2023, p. 1-26.

Wikipedia, Silicon drift detector, retrieved from https://en.wikipedia.org/w/index.php?title=Silicon_drift_detector&oldid=1137361292', Jul. 2023, p. 1 of 1.

Soltau et al., New Detector Architecture for Electron Microscopes with SDDs, Microsc Microanal 15 (Suppl 2), 2009, Copyright 2009 Microscopy Society of America, https://doi.org/10.1017/S1431927609094033, Published online by Cambridge University Press, pp. 1-2.

Liebel et al., Concepts for an Annular Pole Piece Detector for the Simultaneous Measurement of X-Rays and Backscattered Electrons Inside a SEM, Microsc. Microanal. 20 (Supple 3), 2014 © Microscopy Society of America 2014, https://doi.org/10.1017/S1431927614007326, Published online by Cambridge University Press, p. 1-2.

Pirrie et al., Chapter 26, Automated SEM-EDS (Qemscan®) Mineral Analysis in Forensic Soil Investigations: Testing Instrumental Reproducibility, Helford Geoscience LLP, Menallack Farm, Treverca, Penryn, Cornwall, TR10 9BP, Uk, dpirrie@helfordgeoscience.co.uk, DOI:1007/978-1-4020-9204-6_26, K. Ritz et al. (eds.), Criminal and Environmental /soil Forensics © Springer Science+Business Media B.V. 2009, pp. 411-430.

* cited by examiner

Prior Art

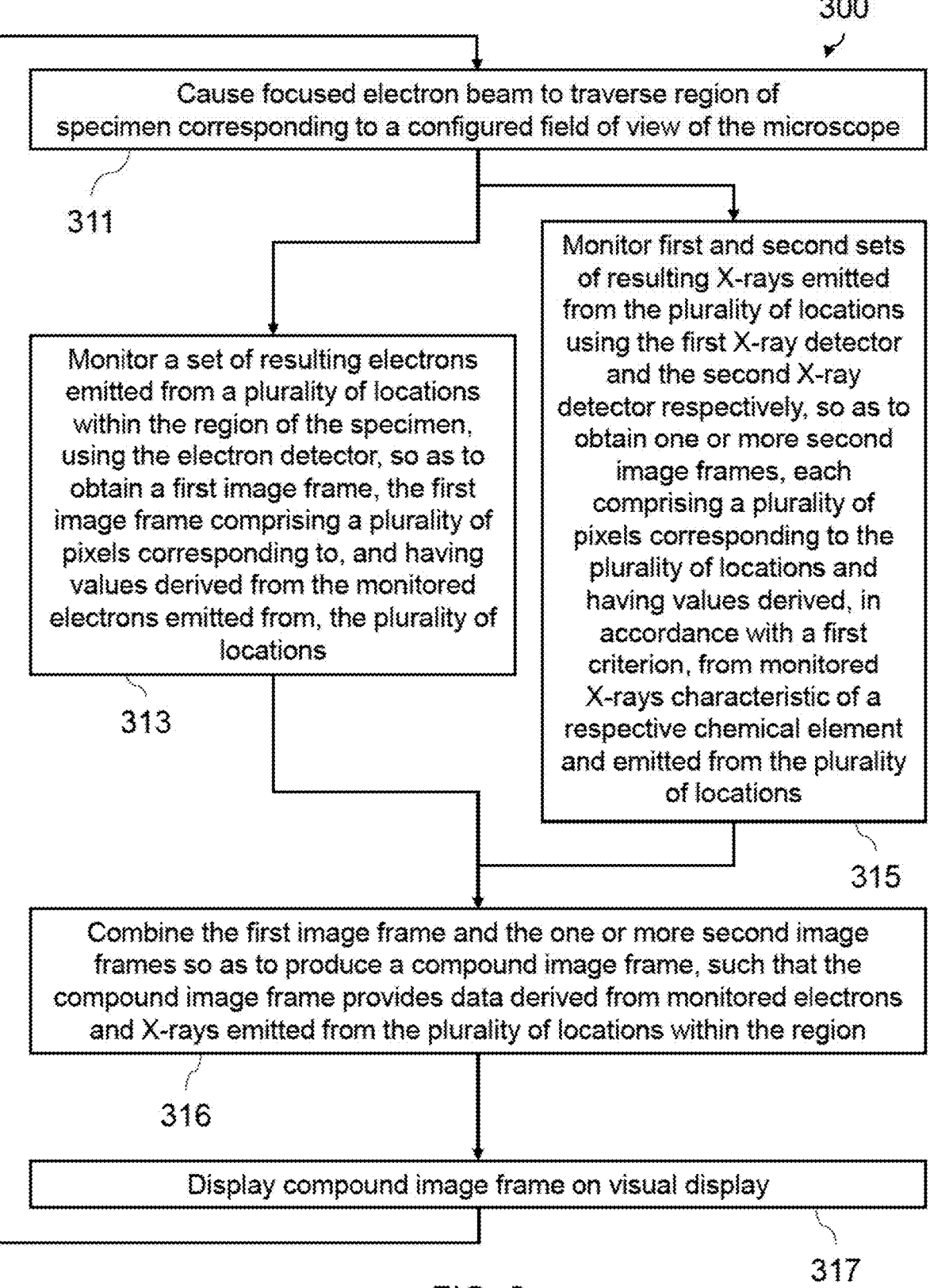

300

Cause focused electron beam to traverse region of specimen corresponding to a configured field of view of the microscope

311

Monitor a set of resulting electrons emitted from a plurality of locations within the region of the specimen, using the electron detector, so as to obtain a first image frame, the first image frame comprising a plurality of pixels corresponding to, and having values derived from the monitored electrons emitted from, the plurality of locations

313

Monitor first and second sets of resulting X-rays emitted from the plurality of locations using the first X-ray detector and the second X-ray detector respectively, so as to obtain one or more second image frames, each comprising a plurality of pixels corresponding to the plurality of locations and having values derived, in accordance with a first criterion, from monitored X-rays characteristic of a respective chemical element and emitted from the plurality of locations

315

Combine the first image frame and the one or more second image frames so as to produce a compound image frame, such that the compound image frame provides data derived from monitored electrons and X-rays emitted from the plurality of locations within the region

316

Display compound image frame on visual display

LIVE CHEMICAL IMAGING WITH MULTIPLE DETECTORS

CROSS REFERENCE

This application is based on and claims priority under 35 U.S.C. 119 to Great Britain Application No. 2300537.4, filed on Jan. 13, 2023, the disclosure of which is hereby incorporated by reference in its entirety.

FIELD OF THE INVENTION

The present invention relates to and method and system for acquiring analytical imaging data for a specimen in an electron microscope, using multiple X-ray detectors, together with an electron detector, to improve navigation and provide elemental analysis of specimens with high data quality and at high speed.

BACKGROUND

FIG. 1 shows a typical system that is employed in a scanning electron microscope (SEM) for exploring the surface of a specimen. The electron beam is produced inside an evacuated chamber and usually focused with a combination of magnetic or electrostatic lenses. When the beam strikes a specimen, some electrons are scattered back from the specimen (backscattered electrons or BSE) or interact with the specimen to produce secondary electrons (SE) and a number of other emissions such as X-rays.

FIG. 2 shows a known apparatus for X-ray analysis in a scanning electron microscope (SEM) 100.

In conventional analysis, an X-ray spectrum is measured by sensing and measuring the energies of individual X-ray photons emitted by a specimen 101 when it is hit by a focused electron beam 102. (Note that in this document, the convention is that the electron beam travels vertically downwards towards the specimen and this is the context for words such as "below" and "above". In practice the electron beam can be oriented in any direction, including vertically upwards.) Each X-ray photon is an energetic particle and the energy is typically converted into a charge, which correlates to the X-ray energy, using a solid-state detector 105. The charge is measured so that a count can be recorded; the histogram of recorded measurements represents the digitised X-ray energy spectrum. Peaks characteristic of chemical elements can be identified in the X-ray energy spectrum and the intensity of those peaks used as the basis for determining elemental content of the material that is directly under the electron beam 102.

The X-ray detector 105, the final polepiece of the electron microscope 104 and the specimen 101 are usually all within the same vacuum chamber. The vacuum is primarily needed so that the electrons can be accelerated to several keV energy and focused to a narrow beam without scattering on gas molecules. However, there are alternative configurations where the electron beam may be focused within a vacuum region while the specimen is in a region of higher pressure. The X-ray detector may be located in the same vacuum region as the electron beam or in a region of higher pressure. Besides the X-ray signal, the signal from electrons backscattered from the specimen (BSE) is also useful for discriminating different materials because the fraction of electrons backscattered from a material increases with the mean atomic number (Z) of the material. Consequently, a backscattered electron detector (BSED) is often positioned above the specimen 101 and below the polepiece 104. A BSED detector 106 typically comprises one or more sensor segments disposed about a central hole through which the focused beam 102 passes to reach the specimen. This positioning is designed to maximise the collection solid angle subtended by the BSED segments at the point where the focused beam strikes the specimen, the "probe spot" and thus maximise the BSE signal. An additional detector, typically of the "Everhart-Thornley" type and mounted to one side of the chamber is used to detect secondary electrons that are generated in the specimen and emerge from the surface and thus produces the "SE" signal. The SE signal is usually considerably stronger than the BSE signal and is very sensitive to surface orientation relative to the incident beam.

If the focused incident beam is rastered or scanned in some other pattern by deflecting the beam magnetically or electrostatically and positioning sequentially over a 2D grid of pixel positions on the specimen surface, the SE or BSE signal at each position can be used to build a digital image that can be displayed on a monitor and gives a magnified view of the specimen. This is well-known principle of operation for the scanning electron microscope (SEM) and the SE image in particular is very useful for navigating around the specimen because it shows the topography of the surface. If there is any topography on the specimen, any tilted surface facets will also produce BSE signals that are dependent on the orientation of the facet and will be stronger in certain directions. The BSE signal is stronger for a region of a sensor that is in the direction of tilt of the facet away from normal to the electron beam and weaker for a sensor that is in the opposite direction. This sensitivity to surface tilt produces "topographic contrast" in the image that interferes with the "atomic number contrast" or "Z contrast" produced by changes in composition of material within the scanned region. In order to minimise the directional effect of topography on the BSE signal, it is imperative that the total sensitive area of the BSE detector is symmetrically disposed with respect to the incident electron beam. Ideally, the sensitive area would be a disk with perfect rotational symmetry about the central hole but there are some benefits to using a multiplicity of independent sensor segments to make up the total sensitive area while maintaining rotational symmetry. The "4-quadrant" arrangement, with 4-fold rotational symmetry, is common as seen for example in the Micron Semiconductor catalogue:

http://79.170.44.80/micronsemiconductor.co.uk/wp-content/uploads/2017/03/MSL-OEM-Catalogues.pdf. It is well known that if all segments of a multi-segment BSE detector are used to collect electrons symmetrically about the beam, "atomic number" contrast dominates rather than topographic contrast. See for example Wikipedia entry: https://en.wikipedia.org/wiki/Scanning_electron_microscope#Detection_of_backscattered_electrons.

Thus, the positioning of a BSE detector at 106 just below the polepiece not only provides good collection efficiency for the BSE signal but also enables a signal to be collected that is more representative of mean atomic number of the material rather than local surface tilt. The BSE signal at each pixel position can be used to build an image where each pixel intensity is indicative of material atomic number at that position.

The same position 106 can also be used to maximise the collection solid angle for an annular X-ray detector. However, replacing the BSED with an X-ray detector in position 106 would remove the capability to detect a BSE signal that is insensitive to topography. Soltau et al (Microsc Microanal 15 (Suppl 2), 2009, 204 5) suggest a method to overcome this problem by surrounding a ring of sensor segments for BSE with an outer ring of X-ray sensor segments.

The BSE detector segments are closest to the central hole and are disposed symmetrically around it while the X-ray detector segments, also symmetrically disposed, are further from the central hole.

While this arrangement puts both BSED and X-ray sensor segments close to the specimen and maintains 4-fold rotational symmetry for the BSED total sensitive area, the collection solid angle for the X-ray sensor segments is compromised by being positioned further away from the central hole in order to accommodate the BSED sensors. Furthermore, if the individual X-ray sensor segments are "silicon drift detector" (SDD) type (see for example https:// en.wikipedia.org/wiki/Silicon_drift_detector), for a given area, the optimum response time is achieved for a circular sensor segment so the elongated shape of the X-ray sensor segments in the surrounding ring arrangement not optimal with regard to response time for a given sensitive area.

The X-ray detector segments will also be sensitive to backscattered electrons and since there are orders of magnitude more BSE than X-rays striking the sensor segments, the BSE signal would normally overwhelm the small X-ray signal and prevent the acquisition of a useful X-ray spectrum. Therefore, a filter material needs to be interposed between specimen and sensor with suitable thickness to prevent transmission of the highest energy BSEs while allowing low energy X-rays to pass through to the sensor. Liebel et al (Microsc. Microanal. 20 (Suppl 3), 2014 1118-9) suggest an arrangement using combined BSE and X-ray sensors with filters in front of the X-ray sensors.

In a SEM with EDS (Energy Dispersive X-ray Spectrometry) configuration the X-ray signal is very weak compared to the electron signal. The conventional analysis approach is to use a live updating electron image, with a refresh rate fast enough to allow continuous viewing of the changing field of view on the specimen as the operator searches around on the specimen surface, to find a region of potential interest. Once that region of interest is located, X-ray data is collected from that region and used to enhance the electron image with chemical element compositional information derived from the X-ray data, either as additional images of the field of view of interest or as typically by colour mixing combined with the electron data (image brightness and contrast) in a single composite image. If the compositional information shows the region is not of interest, the search is resumed using the live updating electron image. This procedure can be very inefficient because some regions with important compositional content can be missed as the operator only has the brightness and shape information conveyed by the electron image to make a decision and these do not necessarily coincide with compositional variations.

The approach described in WO2019/016559 involves X-ray data being acquired simultaneously with the electron signal data so that the live updating image can be enhanced with chemical element compositional information at the same refresh rate, and so provides more visual cues to help the operator find a region of interest that is more likely to be suitable for more detailed analysis.

When collecting X-ray image frames or element maps which refresh fast enough and have a high enough spatial resolution to show an operator useful information about a specimen while the image changes, e.g. by moving the specimen or changing magnification, a conventional EDS detector can only produce enough signal when using very high beam currents.

The attainable beam current depends on the type of electron assembly. In order to achieve high beam currents, generally the SEM lens and aperture configuration has to be changed, which generally leads to increased beam diameter, and results in some loss of spatial resolution. Furthermore, high beam currents may be damaging to some specimens.

Even at beam currents where the specimen is resilient and spatial resolution is acceptable, it is desirable to obtain as much X-ray signal as possible to improve the quality of the compositional information.

One way of increasing the solid angle and therefore the X-ray signal is by using multiple conventional EDS detectors. Systems with up to four detectors have been used for the collection of data for the separation of particles for the quantification of ore mineral liberation (e.g Pirrie et al 2009, DOI: 10.1007/978-1-4020-9204-6_26). Such systems can improve throughput, but still use a high beam current due to the solid angles achieved being not significantly greater than the largest single conventional EDS detectors produced. Moreover, such systems are costly and require a dedicated electron microscope arrangement, occupying most ports and severely limiting the availability of other sensors and the operation of the electron microscope.

An X-ray detector positioned directly above the specimen and under the pole piece can provide a much bigger increase in X-ray signal if it is close enough to the specimen.

However, in this position, there is generally insufficient space to accommodate a magnet to divert electrons backscattered from the specimen, and a layer of suitable material, as described earlier, thick enough to prevent backscattered electrons from overloading or damaging the X-ray detector, needs to be interposed between the specimen and the sensitive area of the detector. Unfortunately, this electron filter will also attenuate the X-ray signal, in particular for low-energy X-rays.

When backscatter electrons impact the filter material, the act of their absorption, will result in the emission of characteristic X-rays from the filter, some of which will be detected by the X-ray sensors. Therefore, for example, a carbon filter will produce a carbon X-ray signal, which will accentuate the signal for that element, or create a false positive signal for that element if it is absent from the field of view.

At lower beam energies, thinner filters, which cause less attenuation of low-energy X-rays, may be used. However, as the filter thickness decreases, the energy of backscattered electrons that the filter is able to block from the detector will also decrease. Therefore, a thinner filter generally necessitates the use of a lower beam energy. This limits the detection of many elements to lower-energy lines, which have lower intensity, and give less accurate results.

In a scanning electron microscope, the incident electrons are typically accelerated to an energy of 20 keV, and in order to block BSEs up to this energy, a filter such as a of Mylar at least 6 microns thick is required.

With such a filter in place, the detector will be insensitive to X-rays below about 1 keV in energy so that elements with characteristic line emissions below 1 keV will be difficult to identify in the X-ray spectrum. For example, elements Be, B, C, N, O, F, Ne, Na would be very difficult to detect with such a filter in place.

A further problem with some existing arrangements is that because the module containing the combined BSE and X-ray sensors has a larger diameter than a typical BSE detector, the module may partly or completely obscure the line of sight to the specimen 103 for a detector or any other accessory device that is mounted to one side of the microscope. FIG.

2 illustrates the occlusion of lines of sight of a side-mounted detector 105 by a large-diameter detector module 106 below a microscope polepiece 104 that occurs in conventional arrangements. Existing arrangements therefore generally preclude the concurrent use of both sensors 105, 106, and require that analyses instead be performed with only one detector component at a time.

One solution for detecting a wide range of X-ray energies is described in WO 2014/202608 A1 and involves the use of different filters for different conditions. However, collecting data on-the-fly to investigate a sample requires the elements present in any field of views that will be visited to be detectable. If a filter that is made thin enough to transmit low-energy X-rays such as those characteristic of carbon, oxygen, or nitrogen, the incident beam energy has to be reduced otherwise backscattered electrons will penetrate the filter and reach the X-ray sensor. This reduction in beam energy reduces the generation of higher-energy X-rays and lessens the collection solid angle advantage of a sub-pole-piece detector compared to a conventional detector mounted to one side. In practice this means that more than one filter and microscope beam configuration is needed to explore a large area on the specimen surface for a wide range of chemical elements, rendering on-the-fly continuous detection of all elements for interactive exploration impractical for an unknown sample.

The requirement for a filter can be avoided in special microscope configurations where the lens of the microscope is designed to provide a field to divert BSE away from the X-ray detector (U.S. Ser. No. 11/145,487 B2). Such a design might not be compatible with other common accessories in a scanning electron microscope. Furthermore, such a configuration also requires the specimen surface to be positioned close to the final part of the electron lens and this can be impractical when moving the specimen stage to explore specimen surfaces that vary in height rather than being totally flat.

A need exists for a more effective interactive approach for specimen analysis that provides continuous display of morphology information from an electron detector, and high-quality chemical composition data for a wide range of elements while exploring a specimen in an electron microscope.

SUMMARY OF INVENTION

In accordance with a first aspect of the invention there is provided a method for analysing a specimen in a microscope, the method comprising: acquiring a series of compound image frames using an electron detector, a first X-ray detector, and a second X-ray detector, wherein the first X-ray detector is positioned between the specimen and an electron beam source from which a focused electron beam emerges towards the specimen, and is provided with a filter member interposed between the first X-ray detector and the specimen and adapted to reduce the incidence of electrons on the first X-ray detector, wherein the second X-ray detector is provided with a deflector arrangement configured to reduce the incidence of electrons on the second X-ray detector, and wherein acquiring a compound image frame comprises: a) causing the focused electron beam to traverse a region of the specimen; b) monitoring a set of resulting electrons emitted from a plurality of locations within the region of the specimen, using the electron detector, so as to obtain a first image frame, the first image frame comprising a plurality of pixels corresponding to, and having values derived from the monitored electrons emitted from, the plurality of locations; c)

monitoring first and second sets of resulting X-rays emitted from the plurality of locations using the first X-ray detector and the second X-ray detector respectively, so as to obtain one or more second image frames, each comprising a plurality of pixels corresponding to the plurality of locations and having values derived, in accordance with a first criterion, from monitored X rays characteristic of a respective chemical element and emitted from the plurality of locations, wherein the set of electrons and the first and second sets of X-rays are emitted from the specimen substantially simultaneously; and d) combining the first image frame and the one or more second image frames so as to produce the compound image frame, such that the compound image frame provides data derived from monitored electrons and X-rays emitted from the plurality of locations within the region, and displaying the series of compound image frames on a visual display, wherein the visual display is updated to show each compound image frame in sequence.

The inventors have realised that the problems associated with known detector arrangements and analysis techniques may be overcome by way of a novel approach involving multiple detectors and deriving image data therefrom. Efficient and rapid specimen navigation is enabled together with higher-quality elemental analysis visual data, by way of monitoring the particles emitted from a specimen under analysis using two X-ray detectors, the first being arranged so as to have a wide collection solid angle, and the second being provided with a deflector arrangement to mitigate the effects of incident electrons without compromising the transmission of X-ray signals, and utilising the monitored X-ray data in a particular manner in accordance with a first criterion so as to optimise the quality of the element maps that can be produced and displayed.

The method provides a solution that can offer real-time imaging, with a fast enough refresh rate for use when the microscope field of view is changing, and can combine morphological information and high X-ray intensity for compositional information without the need for very high beam current, and avoiding the loss of low-energy information for the low-atomic number elements.

A side-mounted detector can be provided with a deflector arrangement, and generally requires no electron filter. Thus, for low atomic number elements, a side-mounted second detector can typically achieve a signal considerably greater than the first detector, which is generally a sub-polepiece detector fitted with an electron filter.

The partial or total occlusion of a side-mounted detector can be avoided by using a smaller sub-polepiece detector, or increasing the working distance, but this typically reduces the solid angle, which can be mitigated by using a specially-shaped sub-pole piece detector to enable good line-of-sight, as described later in this disclosure and exemplified in WO 2022/008924 A.

The method may involve collecting signals from at least one electron detector, at least one sub-polepiece detector, and one or more side-mounted X-ray detectors simultaneously, and using the improved low-energy response of a side-mounted auxiliary detectors to provide additional information on the low-Z elements.

This approach also allows the use of the side-mounted X-ray detector to determine the elements present in the sample. This may be done using an automatic or automated peak identification routine on a spectrum. By using a spectrum which combines (e.g. sums) all the spectra obtained from several, if not all, of the pixels in the image, sufficient signal can be generated to provide the signal-to-noise ratio (S/N) to detect the elements present using the side-mounted detector, which is sensitive to the a larger element range than the sub-pole piece detector, in particular with respect to light elements, that is those with lower atomic numbers.

By using a side-mounted second X-ray detector for element identification, the influence, on the list of elements identified by the system and displayed by the software, of any light-element artefact signal caused by backscatter-induced X-ray fluorescence of the filter can be avoided.

The method typically allows simultaneous collection of information from the electrons and the X-rays of all elements in a specimen. This data can then be processed and presented in a compound image frame on a software interface visual display or graphical user interface (GUI), for example by showing: The electron image to represent the topography of the sample with the elemental images using the detector with the highest X-ray intensity for that element. The images may be displayed separately and/or overlayed with each element given a different hue and the electron image giving the intensity for each pixel in the image.

The method preferably facilitates real-time tracking of a specimen under a microscope by way of displaying combined images in real-time. The sequential and rapid presentation of the series of acquired compound image frames provides an operator with a "live" view of a specimen being analysed by the detectors. In the context of this disclosure, a series may be understood as a plurality of compound image frames occurring one after the other. The series may be thought of as having an order. Typically, this is the order, or corresponds to the order, in which the compound image frames were acquired, and/or the order in which their respective component frames, that is the first image frames and the second image frames, were obtained. Typically, the order of the series of compound image frames is the same order in which they are displayed.

The series does not exclude this set of compound image frames being a subset of a larger set or series of frames. Neither does the series necessarily exclude the possibility of overlap, in time and/or with respect to compound image frames in each set or series, with a further set or series of acquired frames. It is possible that the series may be interrupted, for example by further frames that are not considered part of the series. For instance, intervening compound image frames might be acquired in the same, or different, manner, and such interruptive compound image frames would not be considered part of the series. Preferably, however, the series is an uninterrupted series.

In this disclosure, the feature that acquiring a compound image frame comprises the above recited steps may be understood as meaning that acquiring each compound image frame in the series comprises these steps, in typical embodiments.

The recited electron detector may be a secondary electron detector. In some embodiments, the monitoring at step (b) may be performed using an electron sensor arrangement, which may comprise any one or more of a secondary electron detector and a backscattered electron detector. The relative positioning of the one or more detectors with respect to any other detector, the microscope, or the specimen, may vary in different embodiments.

Generally, the positioning of the first X-ray detector between the specimen and the beam source is implemented by the first X-ray detector and/or a module comprising it, being positioned below a polepiece of the electron beam assembly from which the focused electron beam emerges towards the specimen—that is between the polepiece and the specimen. The first X-ray detector may be level with the polepiece with respect to the beam axis, for example within the polepiece, or partly or entirely surrounding or encircling the polepiece.

It will be understood that some degree of focusing of the electron beam is generally required in a scanning electron microscope in use. This facilitates the scanning of an image on a field of view. Typically, the degree of focusing that is applied to the focused electron beam is set or configured in accordance with a desired or predetermined spatial resolution for any one or more of the first, second, and compound image frames. In practice the achieved focusing may be influenced by other factors and may differ from the configured degree. Moreover, it is also envisaged that the method may be performed with the electron beam defocused, at least to some degree, and in this way the beam referred to in relation to step (a) may generally be called an electron beam.

The filter member may be provided as a filter layer. The filter member typically has a size, shape, and/or position selected to occlude all, or substantially all, of the first X-ray detector active area from a region of the specimen on which the beam is incident, or from which particles are emitted in response to the beam. Preferably, the filter member or layer has a footprint and/or an area greater than or equal to that of the active area of the first X-ray detector. Preferably the filter member is disposed directly over the one or more sensor elements of the first X-ray detector so as to cover them. The filter member may be called an electron filter. The filter member may be understood as being interposed so as to block electrons. It is typically disposed on or over at least a portion of an active area of the first X-ray detector, which may be provided in one or more sensor elements as noted above.

The filter member being adapted and/or positioned to block or shield the first X-ray detector from electrons, such as backscattered electrons particularly, reduces the unwanted effects of those electrons on the X-ray detector while permitting the first X-ray detector to be positioned as specified so as to subtend a large collection solid angle at the beam spot, owing to the small size and space requirements of the filter member. In other words, the filter member, unlike typical deflector arrangements such as electron traps, is thin, and so can generally be accommodated between the sample and the sub-polepiece detector. The filter member is preferably adapted to block at least a portion of the electrons, more preferably all of the electrons, and in particular those with the highest energies, that would be incident on the X-ray detector in use. The filter member typically operates by blocking or preventing the transmission of those electrons through the filter material. In other words, the filter member is adapted to reduce an amount of electrons transmitted therethrough. Although the filter member is typically adapted to shield against backscattered electrons, alternatively or additionally, the filter member may be adapted to block the transmission of any one or more of visible light, and infrared radiation, while allowing the transmission of X-rays having energies within a first range of energies. The aforementioned incidence of electrons on the first X-ray detector may be thought of as incidence of those electrons on a sensor element or multiple sensor elements thereof.

The second X-ray detector is typically a conventional X-ray detector as described earlier in this disclosure, typically an energy dispersive detector (EDS). The second X-ray detector is typically mounted in a side port of the electron microscope in use. Owing to the positioning of the second X-ray detector typically being further from the specimen and polepiece, which permits a larger detector device, the second X-ray detector may be protected from incident electrons in a different manner from the first X-ray detector, in particular using an electron deflector arrangement. Typically, the aforementioned deflector arrangement comprises or is provided as a magnet arrangement. The arrangement may comprise one or more magnets. It may comprise either or both of permanent magnets and electromagnets, and is typically provided as a pair or array of permanent magnets.

Generally the deflector arrangement is configured to deflect electrons so as to reduce the incidence of electrons on the second X-ray detector. Typically, the deflector arrangement is or comprises an electric and/or magnetic deflector arrangement. This may be configured to deflect electrons away from at least the sensitive or active area of the detector, for example by way of generating a field. This may comprise either or each of a magnetic field and an electric field (such as an electrostatic field). The field may be created or generated by a number of means. The deflector arrangement may be referred to as an electron trap in typical arrangements. The aforementioned incidence of electrons on the second X-ray detector, and/or in particular an active area thereof, refers at least to the incidence of electrons that occurs, or would occur in the absence of the deflector arrangement, in use.

The region of the specimen typically corresponds to a field of view of the microscope. This may be understood as the part of the specimen surface that is to be shown as a visual image in the compound image frame.

The emitted electrons and X-rays are called "resulting electrons and resulting X-rays" for the reason that they result, or their emission results, from the electron beam interacting with the specimen.

The plurality of locations within the region of the specimen may also be understood as a plurality of locations along the path of the transversal of the region by the beam. They may also be called sampling points or sampling locations in the sense that electron and X-ray signals are collected or sampled from, and based on particles emitted because of the electron beam being incident on, that plurality of locations of the specimen. The plurality of locations is the same for both the monitored electrons and the monitored X-rays. That is, preferably the same sampling locations are used for the preferably simultaneous acquisition of electron and X-ray data. This contributes to the low-latency, "live" imaging that may be provided by the method. Each second image frame comprises a plurality of pixels corresponding to the plurality of sampling locations correspond to the pixels in each image frame. It will be understood that there need not necessarily be a one-to-one correspondence between monitored locations and pixels, although this is preferable. In some embodiments, for some pixels at least, signals for multiple locations may be combined so as to form a single pixel, in order to produce a lower-resolution image frame with an improved signal-to-noise ratio.

The first criterion may be applied, in some embodiments at least, to compensate for the deleterious attenuation of lower-energy X-rays by the filter member. It may be configured so that X-rays from the first set of X-rays are preferentially used for deriving the pixel values of a second image frame compared with those X-rays from the second set, for example for elements having one or each characteristic peak in a higher energy spectrum portion. Conversely, the criterion may be configured to represent X-rays from the second set of X-rays preferentially over those from the first set, for elements with peaks in a lower energy spectrum portion.

Generally, the deriving of a pixel value from monitored X rays characteristic of a respective chemical element and emitted from the plurality of locations, may be thought of as deriving a pixel value using monitored X rays characteristic of the respective chemical element and emitted from the plurality of locations.

A respective first criterion may be used for each second image frame or each respective element. In other words, for each of the one or more second image frames: a respective first criterion may be configured in accordance with the respective chemical element, and the values of the plurality of pixels comprised by the second image frame may be derived in accordance with the respective first criterion. Configuring respective first criteria for each second image frame in this way enables a direct relationship to be defined between a given element being mapped in a second image frame and the way in which data is taken from the two X-ray sensors in order to image it. Configuring a first criterion that is specific to the element being mapped in a given second image frame is advantageous in that the output from the two detectors can be treated differently for each element, if appropriate, and in particular because the pixel values for an X-ray image for a chemical element can be derived in a way that may be specifically chosen for that individual element so as to optimize or enhance the quality of the derived data. In this way, better signal and high-quality image data can be obtained across a wide range of X-ray energies and a correspondingly wide range of elements. An element-specific first criterion may be implemented by applying a particular mode of deriving pixel values in dependence on the element itself, which may be identified during the method or may have been identified previously, or a property, category, or classification thereof. An element-specific criterion may be implemented in dependence on an energy value of monitored X-rays corresponding to the chemical element, that is in the absence of, or regardless of, a specific element having been identified from the monitored data, but based on the energies of monitored X-rays corresponding to the element in question.

A given first criterion configured for a given second image frame may be the same as, or different from, another first criterion that may be configured for another second image frame obtained during the acquiring of a compound image frame, and this is preferably the case for a plurality of, or each of, the series of compound image frames. Typically, a respective first criterion is configured in accordance with one or more energy values or ranges of values corresponding to one or more characteristic X-ray peaks of the element. An element-specific first criterion may be specifically configured for one or more elements or values, or may be configured such that, for any elements whose characteristic peaks fall within a specified or predetermined energy range, or are higher or lower than a specified or predetermined energy threshold, the pixel values of the second image frame are derived in a predetermined manner. In some cases, the criterion may be the same for multiple second image frames, at least for a given compound image frame being acquired, in particular when the relative capabilities of the first and second X-ray detectors for monitoring X-rays characteristic of the respective multiple chemical elements corresponding to the multiple second image frames are the same or sufficiently similar, or where the characteristic peaks of two elements have similar energies or lie within a given energy range on the X-ray spectrum. For instance, identical or similar first criteria, which may for example cause their respective second image frames to be predominantly or entirely derived from the output of the second detector, may be configured for multiple light elements, or multiple elements whose characteristic peaks are lower in energy than a predetermined or specified threshold energy value, on the basis that the detector performance for X-rays in that range is expected to be superior for the second detector than the first.

However, the individual first criteria may be configured differently for any number of elements or corresponding frames.

In some embodiments, the first criterion may be referred to as a signal criterion, a signal quality criterion, or a signal intensity criterion, since it may be chosen, configured, or calculated based on the achieved, expected, estimated, or otherwise deduced X-ray signal, or signal-to-noise ratio, of one or each of the first and second detectors, or the data therefrom. In particular, the criterion may be based on the relative signal performance of the two detectors for a given characteristic element peak or set thereof, corresponding to a given chemical element.

The first criterion may be chosen or configured as part of the method, for example based on data acquired by any one or more of the detectors. However, preferably the criterion is predetermined, for example based on known or estimated properties or geometries of the detector arrangement (including the properties and geometries of the filter) for one or more X-ray energy ranges.

The criterion may be understood as a condition on which the particular manner of deriving pixel values of a second image frame is based.

The use of the first criterion in deriving the content of an X-ray element frame may, in some embodiments, be considered to mean that the values of the pixels comprised by a second image frame are effectively derived from a respective third set of monitored X-rays characteristic of the respective chemical element and emitted from, the plurality of locations, each respective third set of monitored X-rays being selected from the first and second sets in accordance with the first criterion. The effective selection of the third set of X-rays is done by virtue of selecting from, or otherwise processing, data obtained from the first and second X-ray detectors. That is, the notional third set is defined by a selection that is made, based on the first criterion, from data derived from those X-ray detectors. This selection may be understood as being part of the obtaining of the second image frame. The obtaining of the second image frame typically comprises processing data obtained from the first and second detectors such that the third set of X-rays is selected from the first and second sets, in a particular manner, that manner being determined by the first criterion. In this sense, the first criterion may be referred to as a selection criterion.

The notional third set, or each third set for each corresponding second image frame, may be understood as a subset of the combination or union of the first and second sets of monitored X-rays. In some embodiments, the criterion may be thought of as a detector selection criterion, in the sense that a selection is effectively made based thereon as to which set or sets of monitored X-rays, and therefore which detector or detectors, are used to produce a given second image frame.

The monitored X-rays from which the pixel values of a second image frame are derived will be understood as being "monitored" X-rays in the sense that they are the same as, or at least comprised by, those resulting X-rays monitored at step (c) of the method. It will be understood also that the X-rays from which the second image frame pixel values are derived are monitored X-rays of the first and/or second sets of monitored X-rays.

The monitored X-rays from which the pixel values are derived are, in particular, typically at least a subset of the first and second sets of monitored X-rays. The X-rays from which the pixel values of a given frame are ultimately derived may be thought of as a third set of X-rays, as noted above. However, in preferred embodiments, there is generally no deliberate selection of X-rays per se. That is, typically, there is no selection or manipulation of X-rays in order to arrive at the third set. Rather, the third set may be understood as a theoretical set, that comprises members of the first and/or second sets, and whose content is defined by the manner in which the second image frame pixel values are derived. This derivation is performed according to the first criterion. In other words, the third set may be defined by the type of processing that is performed in order to arrive at the image frame representing a map for the respective element corresponding to the microscope field of view. Thus the third set may be defined as the X-ray photons from which the image frame for an element is derived. The content of the set is typically selected from the first and second sets as a result of the first criterion. The first criterion may accordingly be thought of as defining the steps between monitoring the two sets of X-ray data and the generating of the element map.

The monitored X-rays being characteristic of a respective chemical element may be understood as those X-rays corresponding to, or being representative of, that element. In particular, those X-rays may have energies that are characteristic of the respective chemical element. That is to say, preferably each second image frame corresponds to a respective chemical element, the values of its pixels may represent the X-ray signal, that is they may be derived from monitored X-rays received from the specimen locations corresponding to those pixels (optionally with additional processing having been performed thereon) for X-rays characteristic of a particular element.

X-rays that are characteristic of a respective chemical element may be understood as those X-rays having energies in a respective energy range, or a respective set of energy ranges. Each second image frame may correspond to an energy range or set of ranges, therefore. Typically, these ranges correspond to a respective characteristic spectral peak or set of peaks. Typically, the monitored X-rays from which the pixel values of a given second image frame are derived lie only in that energy range, that is the X-ray photons used to generate an element map are typically restricted to those in a desired peak or set of peaks for that element.

In some embodiments, the first criterion in accordance with which pixel values of a second image frame are derived is configured so as to reduce the influence on the acquired image frames of effects that the surface features and variations in height or elevation of the specimen surface may have on the X-rays received by the detectors. Thus, in some embodiments the first criterion is configured in accordance with a surface topography of the region of the specimen. The method may thus include obtaining specimen topography information, and the first criterion being configured in accordance with the surface topography information. The surface topography information may be obtained based on data acquired by the electron detector, and may be derived from the monitored set of electrons for example, or may be obtained by any other means, such as from a previously performed topographical analysis of the specimen or the region thereof. The surface topography information may comprise an flag or parameter indicating, characterizing, or quantifying the surface topography of the region of the surface or one or more sub-regions thereof.

Adjustments to the criterion for topography may be applied for individual chemical elements or for multiple elements. For example, a specimen may have a rough topography, or the region of the specimen may have a surface profile that could affect the X-rays emitted therefrom or their detection by a detector, owing to any of: occlusion and shadowing by surface features, and variations in take-off angle relative to local surface orientation and in absorption of X-rays by the specimen surface. The second detector, which is typically mounted in a side port, is generally affected by topography to a greater extent than the first detector. For this reason, it may be advantageous to configure the first criterion to favour the output of the second detector to an increased degree, for example despite the second detector foreseeably having a worse signal to noise ratio for a given element or x-ray energy.

The first X-ray detector is typically less strongly affected by such effects, owing to its position between the specimen between the specimen and beam source, and preferably because of its geometry. For example, preferably the first X-ray detector is provided with an active or sensitive area that is symmetrically disposed about the focused beam axis. Such a symmetrical arrangement beneficially mitigates the effects of high surface topography, as alluded to above. It may be beneficial, therefore, to configure the first criterion such that, for at least one chemical element or second image frame, the pixel values are derived preferentially, predominantly, or entirely based on the output of the first X-ray detector. Preferably, the configuring of the first criterion in accordance with the specimen surface topography comprises adjusting one or more weighting coefficients in accordance with which data output by the first and second X-ray detectors is used to produce second image frames. Typically, such an adjustment comprises adjusting one or more coefficients so as to reduce the relative contribution to the pixel values of data output by the second X-ray detector.

Where a specimen has a pronounced topography, the quality of visual data in the produced X-ray image frames can be improved by configuring the first criterion in accordance with the specimen topography, in addition to, or alternatively to, any of the modes of configuring the criterion set out in this disclosure.

The first criterion may be configured such that the values of each of the plurality of pixels comprised by a given second image frame are derived in the same way. In some embodiments, the criterion may be configured to vary the mode of combination for one or more pixels or sets of pixels in a frame, for instance to apply different weighting coefficients for combining data from the first and second X-ray detectors to different parts of a second image frame. This is particularly advantageous in embodiments where the first criterion is configured in accordance with surface topography, as adjustments to the way in which pixel values for a particular portion of a second image frame may be applied in dependence on whether a corresponding portion of the specimen is affected by topography. For instance, if a line of sight from each of a set of one or more locations in the region of the specimen surface to the second X-ray detector is occluded by a protruding part of the specimen surface, the first criterion may be configured to base the second image frame pixel values preferentially on data from the first X-ray detector for the set of pixels corresponding to that set of locations compared to other pixels in the frame. Configuration of the first criterion specifically for one or more pixels, sets of pixels, or portions of a second image frame may be performed in accordance with obtained surface topography information, for example in accordance with corresponding locations, sets of locations, or portions of the region on the sample that may be indicated by the surface topography information to be affected or unaffected by topography effects.

The set of electrons and the first and second set of X-rays being emitted from the specimen substantially simultaneously, preferably simultaneously, may refer to those sets as a whole being simultaneously emitted from the specimen, rather than implying any simultaneity between individually emitted particles within the sets.

The simultaneity of the emission of the said sets may be understood as the respective sets of particles monitored by each of the detectors being emitted at the same time, or in response to the same impingement of the beam on the specimen.

Typically, the monitoring is simultaneous, or substantially so. That is, the different detectors may operate to capture different information about the same field of view at the same time. It will be understood that the traversal of the beam typically means that the plurality of locations is irradiated by the beam in sequence, rather than simultaneously. Preferably, the emission of each of the three particle sets, that is electrons and X-rays, for each of the plurality of locations during acquisition of a compound image frame is simultaneous or substantially so. That is, at each sampling point or location the multiple detectors may monitor the emitted particles at (substantially) the same time. Preferably, all three detectors monitor particles for the entire dwell time at each location, in order to maximise the signal collected by each. However, for a given sample location, one detector may monitor for a longer period than another detector, such that the former effectively monitors additional particles as well as those of its respective set. Such additional particles may, for any of the detectors or image frames, be included in the obtaining of the image frame in order to increase the signal for that frame. The emitted X-rays referred to in step (d) are typically those X-rays having energies within the respective peak or set of peaks characterised in the element to which each of the one or more second image frames corresponds.

The displaying of the compound image frame series is preferably done in real-time. This may be understood to mean that there is substantially no appreciable delay between a user causing a navigation action and that action being represented on the visual display. The representation is preferably in the form of a moving image or video comprising the displayed compound image frame series. The expression "moving image" as used in this disclosure does not necessarily refer to changes to the field of view or image content between frames in the series. Typically, it refers to a succession of images capable of having the appearance, or giving an impression, of movement.

Each compound image frame in the series, or at least of a proportion of it, is preferably displayed on the visual display within a predetermined time period after performing any one or more of steps (a), (b), (c), and (d) in acquiring that compound image frame. The predetermined time period may thus limit the latency of the display relative to the particle signal capture. The time period is typically 1 s, preferably 500 ms, more preferably 300 ms, more preferably still 100 ms. Latency may vary between frames, but typically does not exceed the time period, and preferably is substantially unchanging for a series.

The method typically comprises processing and displaying the image data as soon as it is acquired, so that it is available virtually immediately. In this way, a user is able to use the real-time compound image frames as feedback to guide the navigation around the specimen. For such live navigation, examples of approaches to the interaction with the user and of suitable methods to compose, format, and display compound image frames are described in WO 2019/016559 A1 at pages 8-10. Techniques such as those described in WO 2012/110754 A1 may be used for combining image frames into a colour composite image.

The frame rate of the visual display, that is the rate at which successive compound image frames in the series are displayed thereon, may vary between different embodiments, and may be configurable. In some embodiments, the frame rate at which the compound image frames are displayed is at least 1 frame per second, preferably at least 3 frames per second, and more preferably 20 frames per second. In some embodiments, a single compound image frame is processed at any given time. In such embodiments, the example frame rates set out above correspond to compound image acquisition times, or processing time, of 1 second or less, 0.3 seconds or less, and 0.05 seconds or less, respectively.

In some embodiments, the rate at which the series of compound image frames is acquired and displayed is at least 10 frames per second, preferably at least 18 frames per second, more preferably at least 25 frames per second, more preferably still at least 50 frames per second. Preferably, therefore, the series of compound image frames is displayed in the form of a moving image, preferably the display frame rate is equivalent to a video frame rate.

Advantageously, the acquired images may be displayed and refreshed quickly enough to allow an operator of the microscope to track and react to changes in the images as the field of view is changed.

As set out in this disclosure, the first criterion can be configured to process the output of the X-ray detectors in a number of ways. In one embodiment, it may be configured simply to cause X-ray data from both of the first and second detectors to be summed in order to obtain a second image frame. Thus, the first criterion may be configured such that step (c) further comprises summed data by summing data representative of the first set of monitored X-rays with data representative of the second set of monitored X-rays, and such that the values of the pixels of each of the one or more second image frames are obtained from the summed data. As noted previously, the criterion may be called a condition according to which the deriving of the pixel values of a second image frame are derived by compiling data from both first and second detectors in a particular manner. The summing of the data may be performed according to a weighted sum, in accordance with weighting coefficients. It will be understood that these weighting coefficients may be configured to have any non-negative value. Preferably the first and second data relates to a plurality of chemical elements, and more preferably to an energy range including the peaks for multiple elements. Typically all of those peaks and/or elements detected by either or each of the detectors are included. The first and second data may respectively be the same as the first and second data described in relation to later disclosed embodiments, or may be different.

In some cases, the first criterion may be chosen so that representative data derived from the first and second set of monitored X-rays is processed to obtain corresponding estimates of the monitored emission signal characteristic of a respective chemical element for the second image frame in question, with each value being obtained by a combination of those estimates. Accordingly, the first criterion may, in some embodiments, be configured such that, for each of the one or more second image frames, step (c), and in particular the deriving of the pixel values in accordance with the first criterion, comprises processing data obtained from each of the first and second X-ray detectors so as to obtain first and second value sets (for example sets of one or more values, such as one or more values for each pixel) representative of the respective chemical element. The pixel values may be obtained from the first and second value sets.

In embodiments where the first criterion is configured so that acquiring a compound image frame entails processing first and second detector data to obtain the first and second value sets, the obtaining of the pixel values therefrom may be carried out in a number of alternative ways. A given analysis procedure may involve the first criterion being configured to cause the pixel values to be obtained by any one or more of these approaches.

Firstly, in some embodiments, the obtaining of the pixel values may comprise summing the first and second value sets. This may be the case, for example, for only one second image frame, or may be for multiple second image frames, or each of them during the acquiring of a compound image frame. Other combination techniques may be used for different frames and/or chemical elements. This may apply to the pixel value-obtaining approaches now described.

Secondly, the obtaining of the pixel values may, in some embodiments, comprise obtaining the pixel values from a selected one of the first and second value sets. This may comprise obtaining the pixel values from only that selected one, or exclusive of the other one of the first and second value sets. The selected one of the value sets may be determined or chosen according to a second criterion. The second criterion may be the same as or distinct from the first criterion. Typically the second criterion is configured so as to base the selection on a signal-to-noise ratio for the first and second value sets.

The second criterion may be configured so that the resulting data has the maximum or optimal signal-to-noise ratio.

Thirdly, the obtaining of the pixel values may comprise combining the first and second value sets according to a weighted function. The weighting may be uniform, for one or more second image frames of a compound image frame, or may be configured, by the first criterion, to favour an estimate for which the monitored mission signal is expected to be greater, or exhibit a better signal-to-noise ratio. The expected X-ray emission monitored by first and second X-ray detectors and uncertainty of estimates for this emission may be calculated for a specimen with known chemical composition.

The weighting of the function may be chosen based on the likely or calculated signal-to-noise ratio of each result in order to optimise the S/N of the combination. In some embodiments, for one or more of the elements, the weighting(s) may be configured to be equal so that, for those elements at least, the obtaining of the pixel values may comprise summing the first and second sets as described in the first above-described approach. The weighted function may comprise a weighted sum or a weighted average.

A given second image frame may, in some embodiments, be created according to a different function than another second image frame obtained in step (c). Alternatively, any two or more second image frames may use the same function. Preferably, the same function is applied to multiple second image frames, and/or form multiple compound image frames. This is preferably performed in such a way that the combination is weighted towards the value set that represents the X-ray signal with greatest S/N. Typically, the function is dependent on an estimated or calculated S/N of either of each of the first and second value sets.

It will be understood that in some embodiments S/N is a key factor used in configuring the first criterion. The criterion may be configured in accordance with the S/N performance of one or each of the X-ray detectors, represented for example as a parameter. Thus the first criterion may in some embodiments be based on at least one of first and second signal-to-noise parameters that are representative of a signal-to-noise ratio, which may be measured, calculated, modelled, or simulated, or estimated, for example, for each of first X-ray data derived from the first set of monitored X-rays and second X-ray data derived from the second set of monitored X-rays respectively. Typically, the first criterion is based on both of the first and second signal-to-noise parameters. However, alternatively the criterion may be configured in dependence on only one of the parameters, for example based on whether the parameter exceeds a threshold value, for instance to indicate an acceptable signal capability for a given element.

Alternatively, the criterion may be based on a single parameter indicative of the one of the two X-ray detectors that has the higher signal-to-noise ratio for a given element, or is capable of producing data with the higher signal-to-noise ratio for that element.

Any of these parameters are typically provided as values, for example, numerical values, such as measures or estimates of signal-to-noise ratios, or signal levels, but may alternatively or additionally comprise qualitative representations of these characteristics. The first and second signal-to-noise parameters may be thought of as being representative of a signal-to-noise ratio for each of the first and second X-ray detectors, at least for a given compound image frame being acquired.

The first criterion may be based on a comparison of such first and second signal-to-noise parameters such that, for a second image frame, the pixel values may be derived preferentially from X-ray data, of the first and second data, having a higher signal-to-noise for the respective chemical element. The comparison is typically a comparison made for each second image frame, or in respect of each chemical element for which a second image frame is obtained. The comparison is typically made prior to performing the method. Typically, it is calculated based on a model of the S/N achievable for each detector, for each element. The above-described preferential derivation of pixel values from higher signal-to-noise data may be applied for each of the one or more second image frames.

When thought of in terms of the X-rays that are ultimately used to produce a second image frame, which may be called a third set of X-rays, the criterion is typically based on the comparison such that, for a second image frame the respective third set of X-rays preferentially comprises X-rays from which the data, of the first and second data, that has the higher signal-to-noise ratio for the respective chemical element, is derived. The preferential deriving of pixel values from a particular one of the first and second data may be thought of as the pixel values being derived from that preferred one of those data, in preference over, and/or to a greater degree than, data representing X-rays monitored by the one of the detectors with the lower S/N for that element. Therefore, a greater proportion of the notional third set of X-rays may be obtained from the higher-S/N detector than from the lower.

The signal-to-noise ratio of each set of data is typically influenced by a plurality of factors. Generally, it is dependent on the detector and may also depend on any one or more of the specimen, beam current, beam energy and dwell time. A number of factors affecting the S/N may be obtained for a given system in order to make the comparison and/or configure the first criterion: firstly, the total collection solid angle subtended at the location on the specimen by the sensitive areas of the detector and the incident electron beam current and electron energy; secondly, the fractional transmission through the filter for X-rays with the characteristic emission energy and any losses in signal in the electronic detection process; thirdly, the energy resolution or spread in apparent energies recorded in the energy histogram when the detector is exposed to monochromatic X-rays at the characteristic emission energy; fourthly, the concentration of the chemical element and any residual contribution of the bremsstrahlung background and any emission from other chemical elements that has not been removed by data processing.

Whereas the first, second and third of these considerations can typically be calculated for a particular system, the fourth will typically cause the S/N to be different at locations on the specimen with different chemical composition. Therefore, the first criterion, which may determine how to combine the data, is typically based on the S/N that is expected to be achieved when the beam is incident on a region with a 100% concentration of the chemical element.

The first criterion may be configured in accordance with a signal-to-noise ratio, for example for one or more energies or ranges, which may, in certain situations, be more appropriate.

The filter member may have a high-pass filter effect on transmitted X-rays, removing substantially all X-rays with energies below a certain value. Typically, however, this is not a step function, and the attenuated signals from the X-rays, even though increasingly attenuated at lower energies, may still be of some value. Accordingly, the first criterion is preferably configured so as to combine the signals output by the first and second X-ray detectors in such a way as to take this data into account when deriving second image frames.

The first criterion may alternatively or additionally be chosen based on signal intensity for one or each of the first and second detectors. Accordingly, the first criterion may, in some embodiments, be configured such that, for each second image frame, for instance during the acquiring of a compound image frame at least, the pixel values are derived in accordance with the signal output by each of the first and second X-ray detectors, that is representing or corresponding to the detection of, incident or monitored X-rays characteristic of the chemical element corresponding to the second image frame.

The selection of X-rays, or preferential processing of X-ray data from a particular one of the first and second detectors based on whether the respective element corresponding to the second image frame being obtained has high- or low-energy characteristic peaks may be effected by way of the first criterion being based on a threshold value. In some embodiments, the first criterion is configured such that, if an energy range of the X-rays characterising the chemical element that corresponds to the second image frame is greater than a predetermined threshold value, the pixel values are derived from the first set of monitored X-rays and, if the said energy range is below a predetermined threshold value, the pixel values are derived from the second set of monitored X-rays. The aforementioned energy range typically corresponds to a characteristic peak or one of a set of characteristic peaks for the respective chemical element. For some elements, and/or some threshold values, the value may coincide with or fall within an energy range corresponding to a characteristic peak of the element in the monitored X-ray signal. In such cases, the third set of X-rays from which the pixel values are effectively derived may be selected in preference, or exclusively, from either of the first or second sets of X-rays, or may be effectively selected as a weighted combination of the first and second X-rays sets, for example with weighting based on the position of the threshold value within the range of energies corresponding a peak or set of peaks. The pixel values being derived from the first or second set typically comprises those values being derived from that set in preference over the other one of the first and second sets, and in some embodiments exclusive of the other one of the first and second sets.

In some embodiments, owing to the above-described attenuation function of the filter member comprising, typically, a transitional (e.g. continuous) function rather than a step function, a second threshold value may be used. Accordingly, X-rays with energies below both first and second threshold values may be taken exclusively from one of the detectors or the corresponding acquired data, X-rays with energies greater than both of those threshold values may be taken exclusively from the other, and X-rays with energies that fall in between the two threshold values may be taken from a combination of those data, in producing a second image frame.

In some embodiments, either one or both of the first and second aforementioned predetermined threshold values may be configured in accordance with any one or more of: a solid angle subtended by a total sensor area of each of the first and second X-ray detectors at a location at which the focused electron beam strikes the specimen: and a filter parameter representative of an X-ray transmission characteristic of the filter member. The filter parameter may alternatively or additionally comprise or be defined by a function, for example a function of X-ray energy. Typically the parameter or function is configured to represent an effect on the transmission of X-rays through the filter member as it varies for different energies, being typically less transmissive to lower-energy X-rays.

In some preferred embodiments, the method involves identifying chemical elements present in the region of the specimen. A list of such elements may be presented as part of the compound image frame, for example. Typically in such embodiments, the method further comprises populating, which may comprise creating, adding to, updating, or removing from, a set of identified chemical elements. This may be based on the second set of X-rays monitored during the acquisition of at least one of the series of compound image frames, and preferably a plurality of the series, and more preferably all of the series. The set of identified chemical elements may comprise those identified as being present in the X-rays monitored by the second detector. Preferably the identification is based on a spectrum of X-rays collected across all or part of a field of view/ specimen region, before or while acquiring a compound image frame.

Typically, during the acquiring of at least one of the series of compound image frames, step (c) comprises obtaining a respective second image frame for each chemical element of the set of identified chemical elements. This preferably applies at least for the same ones of the series of compound image frames as those for which the peaks are identified, or based on the second X-ray signal for which the list of peaks were populated.

It will be understood that, in such embodiments, the number of second image frames obtained for a compound image frame is at least as great as the number of identified peaks or elements. Accordingly, each of the second image frames typically comprises a plurality of pixels corresponding to, and having values derived from a respective third set of monitored X-ray energies in that one of the identified energy ranges in such embodiments. Chemical compounds may be represented by using a plurality of second image frames, and those frames can be optionally overlaid or otherwise combined in the compound image frames. For example, where a specimen field of view contains silicon dioxide, X-rays characteristic of both of its constituent elements will typically be monitored, and a second image frame obtained for each. Accordingly, each compound image frame would comprise at least a respective second image frame for each of silicon and oxygen. The silicon and oxygen second image frames, or element maps, may be superposed or combined in such a way as to indicate the presence of the elements in the compound together.

Where a list or set of identified elements is involved, the method may involve the first criterion being configured such that the pixel values are derived only or exclusively from the first set of X-rays. Thus, in some cases, second image frames are not derived from the data acquired by the second X-ray detector, with that detector instead being used to identify the chemical elements present in a field of view. This restriction upon the data used for the image frames may be applied for a portion of the series only, or for a portion of the set of identified energy ranges only, in various embodiments.

It is advantageous in some embodiments and with some specimens or analysis systems, to employ pixel aggregation in order to increase the S/N of acquired data so that at least a component of an acquired compound image frame can provide an improved quality of the analytical data, at the expense of its spatial or pixel resolution. Accordingly, for example for a given second image frame, that is for one or more of a second image frame obtained during acquiring one or more of the compound image frames in the series, the acquiring of a compound image frame may further comprise, for at least one of, preferably each of, the one or more second image frames, and in accordance with an aggregation criterion, which may be referred to as a third criterion: for each of one or more subsets of the pixels in the second image frame, combining the values of the pixels in the subset, so as to obtain one or more respective aggregate pixel values, and replacing each of the one or more subsets of pixels in the second image frame with a single aggregate pixel, or super pixel, having a value equal to the respective aggregate pixel value. Thus, groups of adjacent or neighbouring pixels in an image frame can be binned or aggregated by way of addition or averaging or some combination of their pixel values, to produce binned or aggregated pixels, having those values. Binned or aggregate pixels may be represented with a larger size than their constituent pixels in particular on a visual display. Typically, this is applied, in such embodiments for a plurality of subsets of the pixels in the second image frame, preferably it is for all, or substantially all, of the pixels in the second image frame, and they correspond to an aggregate pixel, so that all pixels in a second image frame are aggregated into the resultant steps of super pixels.

It will be understood that each subset typically comprises two or more, such that a subset may be thought of as a group of pixels. The one or more respective aggregate pixel values may be referred to as one or more sets of super pixels having values. Each aggregate value set may correspond, preferably, one-to-one to a subset or group of pixels.

In these embodiments, the aggregation criterion is typically configured in dependence on, that is, it is typically dependent on, the X-ray detector used to monitor the X-rays from which the values of the pixels in the second image frame are derived. In other words, it may be based on the one of the first detector and the second detector from which the second image frame pixel values are preferentially, predominantly, or exclusively derived. That is to say, the aggregation criterion may be based on the third set of monitored X-rays from which that second image frame is effectively selected, and in particular upon whether that third set is selected from, or comprised by, the first monitored set or second monitored set of X-rays. It may additionally or alternatively be based on the detector that was used to monitor the X-rays represented in the second image frame.

Each of the subsets or groups may comprise a number of pixels, which may be called a subset size, that is configured in accordance with a signal parameter value corresponding to the respective monitored X-rays from which the pixel values are derived. The signal parameter value may be based on one or more properties, for example a measurement or estimation of signal intensity or S/N, associated with data representative of one or more of the sets of monitored X-rays. Alternatively or additionally the subset size may be configured according to a signal-to-noise parameter value. Either or each of these parameter values may be the same as that described in relation to the aggregation criterion. The parameter value may be predetermined, for example based on whether the second image frame pixel values are derived preferentially from the first or second sets of X-rays. In such embodiments, the size of a pixel group is preferably dependent on the source of the X-ray signal, and accordingly on the first or second detector, and/or both detectors for instance if the data used is combined therefrom.

The subset size is typically configured, therefore, such that, for at least a subset of the pixels comprised by the image frame, the number of pixels in a group is greater for the lower-signal intensity values or lower signal-to-noise ratios.

The aforementioned signal parameter may be configured in accordance with the set of monitored X-rays from which the pixel values are derived, or from which the respective third set is selected, which may signify that the parameter is configured in dependence on the detector that is used to obtain the second image frame in question.

The signal parameter may be configured such that the subset size, or said number of pixels, which may also be called a superpixel size, is greater for a second image frame whose pixels are derived from X-rays comprised by the second set of monitored X-rays, than for a second image frame whose pixel values are derived from X-rays comprised by the first set of monitored X-rays, at least preferentially, or exclusively. That is to say, a greater degree of aggregation for X-ray data may be applied where that data was obtained using the second detector in preference over the first detector or exclusive of data from the first detector.

The signal parameter may be configured such that the pixel size or number of pixels is dependent on a solid angle subtended by a total sensor area of the one of the first and second X-ray detectors used to monitor the X-rays from which the pixel values of the second image frame are derived at a location at which the electron beam strikes the specimen.

The signal parameter may be configured such that that group size is greater for smaller solid angles and smaller for large solid angles.

It will be understood that the above-described aggregating of pixel data enables improvements to be made to the signal-to-noise ratio for the data at the expense of spatial resolution, and that this concession may be made to different degrees for different elements and/or for different ones of the X-ray detectors (or rather data obtained therefrom). An aggregation (or pixel "binning", as it may be called) approach may comprise, for example, combining a set of pixel values in a vicinity, e.g. 2×2 or 4×4. This produces a smaller (in comparison with the number of frame pixels that are subjected to the aggregation) number of "superpixel values" for superpixels covering the field of view, that is having substantially the same extent as the unbinned or pre-binned pixels.

If the number of pixels in one second image frame is less than the number of pixels in another image frame of the compound image frame, such as the first image frame, or another second image frame corresponding to a different chemical element, the sets of pixel values for that one second image frame can be increased by well-known techniques such as any one or more of: replication, interpolation, and upscaling, in order to provide the same number of pixel values as for the other image frame. Having two or more image frames of a given compound image frame comprise of consist of an equal number of pixels may facilitate the preparation of the compound image frame.

In embodiments where binning is not used, the S/N of displayed X-ray images may nevertheless be optionally improved by low-pass spatial filtering, or "smoothing" at the cost of some blurring of image detail. It will be understood that such smoothing, using a spatial convolution or Fourier transform filter for example, will typically generate an image with the same number of pixels and with improved signal-to-noise, but generally also with some blurring or loss of high-spatial frequency detail. Such a smoothed image can be immediately overlayed with another image with the same number of pixels.

In some implementations, data from both of the first and second detectors is included in each compound image frame. Accordingly, in some embodiments, step (c) comprises obtaining at least two second image frames, wherein at least one of the second image frames comprises a plurality of pixels corresponding to the plurality of locations, and having values derived, in accordance with the first criterion, from monitored X-rays comprised by the first set at least, and characteristic of a respective chemical element and emitted from the plurality of locations, and, at least one other of the second image frames comprises a plurality of pixels corresponding to the plurality of locations and having values derived, in accordance with the first criterion, from monitored X-rays comprised by the second set and characteristic of a respective chemical element and emitted from the plurality of locations. The two aforementioned respective chemical elements may be the same or different.

It is possible in some implementations for the content of the compound image frame to be modified according to identified elements present in the microscope field of view. Thus new element frames, that is second image frames may in some cases be added as they are identified and/or removed from the compound image frame as they are identified as no longer being present in the field of view. Accordingly, the method may further comprise defining a set of chemical elements for at least the portion of the series of compound image frames, typically a set of one or more chemical elements, the set corresponding to a set of spectral peaks identified in accordance with either or both of the first and second sets of X-rays monitored during acquiring the portion of the series.

As alluded to above, elements, or their corresponding second image frames, that have been included in a given compound image frame, may also be excluded from one or more compound image frames, for instance if the presence of the represented element in the field of view is reduced or ends. The said portion of the series of compound image frames may be at least some of the series, and preferably all of the series.

Step (c) of acquiring a compound image frame may comprise obtaining a respective second image frame corresponding to each chemical element of the set of chemical elements. That is to say, a respective second image frame comprising a plurality of pixels corresponding to, and having values derived from a respective third set of monitored X-rays with energies in the respective energy range of the set and emitted from, the plurality of locations, each respective third set of monitored X-rays being selected from the first and second sets in accordance with the first criterion, may be acquired.

In some embodiments, the pixels of a first one of the one or more second image frames have values derived from a combination of a respective third set of monitored X rays in combination with a respective fourth set of monitored X-rays characteristic of a respective second chemical element, different from the respective first chemical element, each respective third and fourth set of monitored X-rays being selected from the first and second sets in accordance with the first criterion.

It will be understood that a second image frame need not be limited to representing, or having values derived from monitored X-rays characterising, only a single chemical element. In some cases, the pixel values of a second image frame may be representative of two or more energy ranges, peaks, or chemical elements. The pixels of a first one of, or, in some embodiments, more than one of, or a subset of second image frames obtained, possibly all of the second image frames obtained, may have values derived from a combination of third and fourth sets as described. Any one or more second image frames may represent a fourth, a fifth, or a further set of X-rays characterizing a fourth, fifth, or further chemical elements, or with energies in respective energy ranges or corresponding to respective further elemental peaks. Each may correspond to an element with a different number of energy ranges or peaks. One or more of the peaks may be common to two or more second image frames. The respective fourth set may be understood as corresponding to a respective second image frame, as the respective third set typically is.

In other words, when acquiring a compound image frame, a second image frame may be produced that additionally incorporates data for one or more further chemical elements. In some embodiments a single colour may represent a combination of more than one element, by virtue of that single colour being assigned to a multiple-element second image frame, such that the presence of those multiple elements in the field of view is mapped in that colour, and thereby the multiple-element map represented by that colour in the compound image frame. That is to say, the method may comprise obtaining one or more second image frames, each comprising a plurality of pixels corresponding to the plurality of locations and having values derived, in accordance with a first criterion, from monitored X-rays characteristic of a respective plurality of chemical elements and emitted from the plurality of locations. Two principal methods of generating a multiple-element second image frame are envisaged.

Firstly, for a given compound image frame, an X-ray image, or second image frame, or a plurality thereof, may be formed, each individually corresponding to the sum of signals from more than one element. Each of the one or more multi-element second image frames may be included in the formation of the compound image frame. It will be understood that, in some embodiments, the inclusion of a multiple-element map in a compound image frame may equivalently be effected by: obtaining multiple second image frames, each corresponding to a respective chemical element, and combining the multiple second image frames in a single combined image frame or array of pixels and including the combined image frame in the compound image frame; and obtaining an individual second image frame for each of the multiple chemical elements to be represented in the combined image frame, and combining the multiple single-element second image frames into a combined image so as to generate, or as part of the generating of, the compound image frame. Either or each of these approaches may be used in a given series being acquired. Any of the computational and/or image processing steps involved in generating a multiple-element map may accordingly be performed at step (c) and/or step (d).

Secondly, the element maps, or second image frames, for a set of individual elements may be combined according to a condition or using a mathematical rule, rather than just a summation. For example, if a user operating the microscope is looking for a material that contains a significant concentration of two elements A and B, but is not interested in materials which have none, or only one of, the two elements present, a second image frame could be constructed from the X-ray maps for A and B, that only showed non-zero pixels when the corresponding pixel values in both maps A and B are above respective threshold values. This would assist the user in highlighting regions likely to contain materials or compounds of particular composition. Thus, the deriving of the values of such a second image frame from monitored X-rays characteristic of the respective plurality of chemical elements may be performed in accordance with an element combination criterion. The element combination criterion may be comprised by, or be configured in accordance with, the first criterion, or vice versa. That is, the two criteria may be interrelated or interdependent. In some preferred embodiments, the element combination criterion may be configured such that, for each pixel of a second image frame corresponding to a plurality of elements, the pixel value is derived in accordance with a comparison, for at least one, and preferably each, of the plurality of elements, between a respective value derived from X-rays characteristic of the element and emitted from the location corresponding to the pixel, and a threshold value. The element combination criterion may, for example, be configured such that, for each second image frame pixel, if the threshold value is exceeded in one or each of the aforementioned comparisons, that is, for one or each of the elements, the pixel value may be set or derived as a combination, such as a sum or average of the multiple respective values corresponding to the multiple represented elements used in the comparisons. In some embodiments, if the threshold value is not exceeded, in any or each of the aforementioned comparisons, the pixel value may be set to a predetermined value, such as a zero value. It will be understood that such predetermined values are nevertheless derived from monitored X-rays characteristic of a respective chemical element and emitted from the plurality of locations, not least in the sense that the individual-element values on which the element combination criterion and/or comparisons depend are derived from those monitored X-rays.

Different modes of combining second image frames together in producing the compound image frame are envisaged. In some embodiments, step (c) comprises obtaining a plurality of second image frames, and the producing the compound image frame comprises juxtaposing two or more of the second image frames.

Some embodiments involve step (c) comprising a plurality of second image frames being obtained, and producing the compound image frame may accordingly comprise overlaying two or more of the second image frames, for example by using known image processing techniques for combining pixel values.

In accordance with a second aspect of the invention there is provided a system for analysing a specimen in a microscope, the system comprising: a first X-ray detector adapted to be positioned in use between a specimen and an electron beam source from which a focused electron beam emerges towards the specimen, a filter member provided such that it is interposed in use between the first X-ray detector and the specimen, the filter member being adapted to reduce the incidence of electrons on the first X-ray detector, a second X-ray detector provided with a deflector arrangement adapted to reduce the incidence of electrons on the second X-ray detector in use, a control module configured to acquire a series of compound image frames using an electron detector, the first X-ray detector, the second X-ray detector, wherein acquiring a compound image frame comprises: a) causing the focused electron beam to traverse a region of the specimen; b) monitoring a set of resulting electrons emitted from a plurality of locations within the region of the specimen, using the electron detector, so as to obtain a first image frame, the first image frame comprising a plurality of pixels corresponding to, and having values derived from the monitored electrons emitted from, the plurality of locations; c) monitoring first and second sets of resulting X-rays emitted from the plurality of locations using the first X-ray detector and the second X-ray detector respectively, so as to obtain one or more second image frames, each comprising a plurality of pixels corresponding to the plurality of locations and having values derived, in accordance with a first criterion, from monitored X rays characteristic of a respective chemical element and emitted from the plurality of locations, wherein the set of electrons and the first and second sets of X-rays are emitted from the specimen substantially simultaneously; and d) combining the first image frame and the one or more second image frames so as to produce the compound image frame, such that the compound image frame provides data derived from monitored electrons and X-rays emitted from the plurality of locations within the region, and a display module configured to display the series of compound image frames on a visual display, wherein the visual display is updated to show each compound image frame in sequence.

It is particularly advantageous to employ a detector, or a detector module comprising, a first X-ray detector having one or more sensor elements arranged to subtend a large collection solid angle at the beam spot in use. Employing a detector or module having such a configuration can improve navigation and analysis of specimens in electron microscopes significantly. Preferably this is achieved by an arrangement allowing a large total solid angle for collection of both X-rays and backscattered electrons detector to be maintained, preferably while ensuring that the module comprising such detectors does not occlude a line of sight to the spot at which the electron beam strikes the specimen for the second X-ray detector, which is typically positioned to one side of the electron beam assembly. The filter member is typically configured, positioned, disposed, or located such that it is interposed in use between the first X-ray detector and the specimen. This is typically achieved by disposing the filter member as a layer of material over the first X-ray detector surface that faces the specimen.

The control module may be configured to control the microscope, and in particular an electron beam assembly thereof. Typically, the electron detector that is preferably caused by the control module to monitor the set of resulting electrons is generally separate from the system. However, the electron detector is typically in data communication therewith so that the system can control the detector.

Preferably the system comprises a detector module comprising the first X-ray detector. More preferably, the detector module is adapted to be positioned below a polepiece of the electron beam assembly such that the detector module receives X-rays and backscattered electrons generated by interaction between the electron beam and the specimen. In preferred embodiments the first X-ray detector comprises a plurality of X-ray sensor elements configured to monitor energies of individual X-ray photons received by any X-ray sensor element. Preferably the plurality of X-ray sensor elements of the first X-ray detector have a total active area greater than 20 mm$^2$. Preferably the radial extent of the detector module with respect to the electron beam axis is less than 10 mm for at least the first portion of the detector module. In this way, limiting the radial extent with respect to the beam axis of the detector module may comprise the module including a cut-out portion, notch, or aperture, so as to provide a line-of-sight to the beam spot for the second X-ray detector.

Examples of suitable detector modules are described in international patent application number PCT/GB2021/051752, the contents of which are herein incorporated by reference in their entirety.

As alluded to above, in some embodiments the system comprises a detector module adapted to be positioned in use between the specimen and a polepiece of an electron beam assembly from which a focused electron beam emerges towards the specimen, the detector module comprising the first X-ray detector and the filter member. More generally, the module may be adapted to be positioned between the specimen and an electron beam source, such that it may be above, around, or inside the polepiece, similarly to the arrangements described in respect of the first aspect. The detector module may preferably further comprise an electron detector. The electron detector may be that which is used to monitor the set of electrons. Alternatively, the electron detector may be a further detector, different from that which is used to monitor the set of electrons, such as a secondary electron detector. The electron detector comprised by the module may comprise one or more sensor elements, possibly arranged as one or more discrete or separate active sensor areas.

In some preferred embodiments, the space below the polepiece is shared with backscattered electron detectors or sensor elements (BSE) in addition to the first X-ray detector. It has been found that BSE detectors having an irregular shape may be employed in order to allow a large solid angle to be obtained while keeping the aforementioned notches or cut-outs in the detector module to ensure a line of sight between the position where the electron beam strikes the sample and any auxiliary detectors. In this way the lines of sight to the side-mounted detectors that may be included in some embodiments, which may include the second X-ray detector, are preserved. Typically the maintenance of symmetry of BSE sensors is important, in order to ensure that the signal intensity due to shadowing effects on non-planar samples is not affected by the geometry of the sensor module. This is described in greater detail later in this disclosure.

The deflector arrangement may comprise a magnet arrangement for generating a magnetic field to deflect electrons away from the second X-ray detector. The magnet arrangement may comprise anyone or more of a permanent magnet and an electromagnet. Any one or more of such magnets may be proximal to the second X-ray detector. This typically constitutes such magnets being sufficiently close, given the strength and extent of their generated magnetic field, to reduce the incidence of electrons on the X-ray sensor element or elements, by way of electromagnetic deflection, but preferably without deflecting the electron beam. Typically at least one magnet is coupled or affixed to the second X-ray detector. Both the second X-ray detector and deflector arrangement may preferably be provided at this part of a detector module, for example attached together as part of the single device.

In some embodiments, the second X-ray detector utilises stray magnetic field generated by one or more components of the electron microscope itself, for example a magnetic lens adapted to focus the electron beam, to provide at least some of the electron deflection function. Thus, in some embodiments, the magnet arrangement comprises a magnet of an electron beam assembly of the microscope. More generally, the deflector arrangement may comprise a component of the electron microscope that generates an electro-magnetic field in use. It will be understood that the afore-mentioned magnet or other component of the microscope, itself need not form part of the system according to the second aspect. The second X-ray device of the system may be provided with the deflector arrangement in the sense that an electron-deflecting field is provided to it by virtue of the X-ray detector being positioned, or adapted to be positioned in use, so that a field generated by the electron beam components acts to cause the said deflection.

Additionally or alternatively to magnetic deflection, an electric field can be employed to reduce or avoid impingement of electrons on the second X-ray detector. The deflector arrangement may therefore typically comprise an electrode arrangement for generating an electric field to deflect electrons away from the second X-ray detector.

The deflector arrangement is preferably adapted to deflect away from the second detector at least 99% of electrons having energies greater than 100 eV and less than the configured beam energy of the focused electron beam. Preferably the deflector arrangement is specifically configured as such. For example, the arrangement may be configured to generate, at least in use, a magnetic or electric field with an average or minimum field strength, preferably at least within a field region, to cause incoming electrons with energies in the said range, to be deflected. Preferably the field is of such a field strength, direction, and/or extent that electrons in that energy range and having an undeflected, or pre-deflection, trajectory that is coincident with the active area of the second X-ray detector, experience a deflecting force attributable to the field that causes their trajectory to be changed to one that does not coincide with that sensor area. For example, a deflected trajectory may be effected by interaction with the generated field that diverges from the sensor, or one that coincides with another component of the system, or any other structure where the electron incidence will not damage or affect the detector, for example a wall member or at least partly surrounding the sensor. In other words, the said deflection away from the second detector may be understood as the deflector arrangement being adapted to effect a change from a trajectory incident on the detector sensor to a trajectory that is not. The said proportion of electrons are preferably deflected away from an X-ray sensor area, and preferably the entire X-ray sensor area of the second detector. The configured beam energy may refer to a minimum, average, or maximum energy of electrons comprised by the electron beam that impinges on the specimen in use.

In some embodiments, the system further comprises an interlock mechanism configured to control the position and/or movement of one or each of the first X-ray detector and the second X-ray detector and a module comprising a detector, so as to prevent a collision thereof. An interlock mechanism may be generally understood to be a device or mechanism for connecting or coordinating the functions of different devices or systems. It is possible in such embodiments to prevent collisions between the first and second X-ray detectors, or modules comprising the same, and their supporting components. For example, the interlock mechanism may be configured such that, before a first detector is retracted, if the second detector is in the way, it will be retracted first, automatically, in order to avoid the collision. After the first detector is fully retracted, the second detector is inserted automatically by the interlock, and returned to its initial position, that is, its position prior to the intervention by the interlock. A similar functionality is provided during insertion of the detector, that is, before inserting the first detector, if the second detector is blocking its insertion, it will be fully retracted, and reinserted after insertion of the first detector.

In accordance with a third aspect of the invention there is provided a non-transitory computer readable medium storing, or having stored thereon, instructions, or program code, or code configured for executing a method according to the first aspect. The instructions may be executable by one or more processors, for example processors of a system for analysing a specimen in a microscope, such as any of the systems described in relation to the second aspect, to cause the one or more processors to perform a method, such as a method according to the first aspect.

BRIEF DESCRIPTION OF THE DRAWINGS

Examples of the present invention will now be described, with reference to the accompanying drawings, in which like features are denoted by like reference signs, and in which:

FIG. 3 is a flow diagram showing an example method according to the invention;

DESCRIPTION OF EMBODIMENTS

With reference to FIGS. 1-13 examples of methods and systems for analysing a specimen in a microscope according to the invention are now described.

Figure 1:
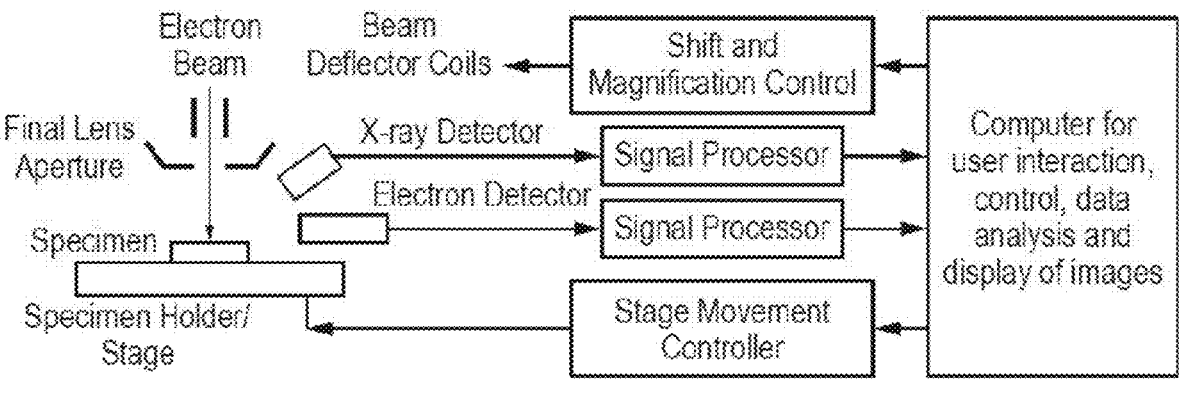
FIG. 1 is a schematic diagram showing the configuration of a scanning electron microscope system for recording electron and X-ray images from a specimen in accordance with the prior art.
Figure 2:
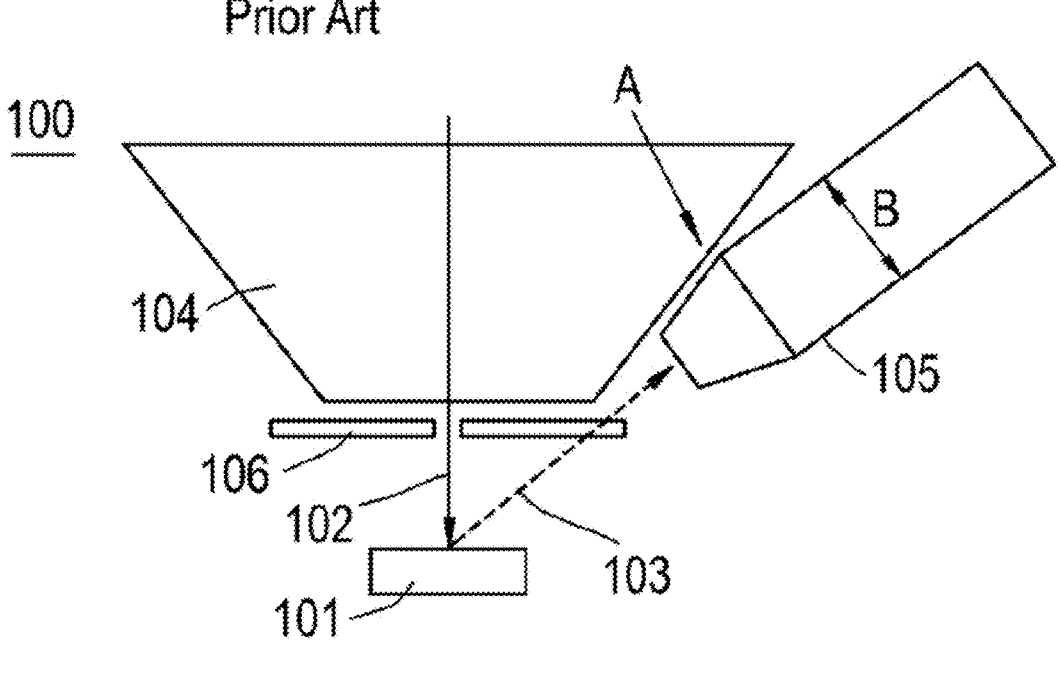
FIG. 2 shows schematically an arrangement for X-ray analysis in an electron microscope according to the prior art.
Figures 4, 5:
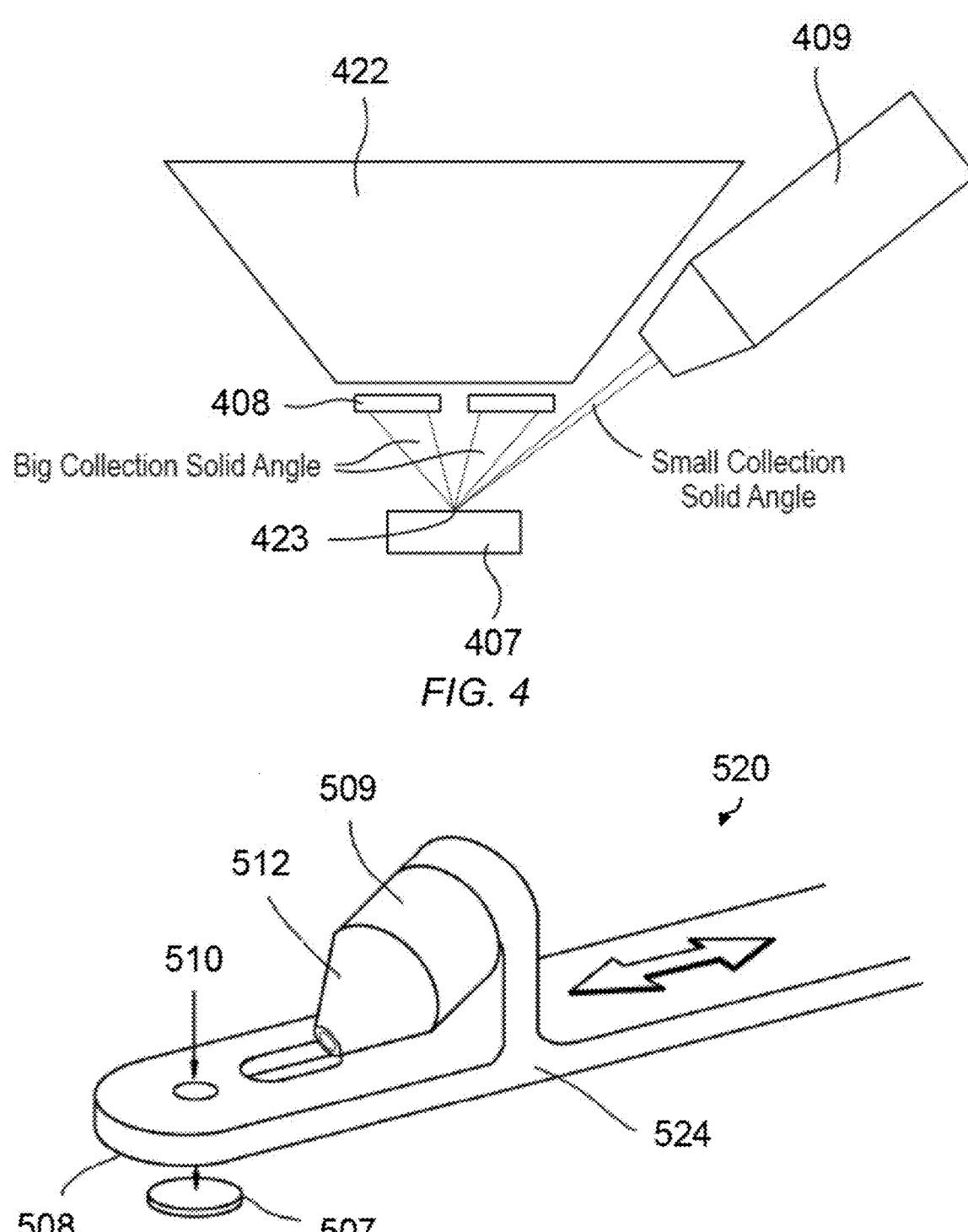
FIG. 4 is a schematic diagram showing an X-ray detector arrangement in a scanning electron microscope that may be used to carry out an example method according to the invention.
FIG. 5 is a perspective view of part of a first example system according to the invention.

Steps of an example method according to the invention are shown in a flow diagram at FIG. 3. The flow chart shows the step 300 for capturing and displaying a single compound image frame in a time series of such frames captured during the operation of an electron microscope, by way of an example apparatus as shown in FIG. 4.

At step 311 the focused electron beam electron microscope is caused to traverse a region of the specimen 407, that region corresponding to a configured field of view of the microscope.

In response to the impingement of the beam, which emerges from the final lens polepiece 422 of the microscope, on the material of the specimen, particles are emitted as a result of interaction between the material and the beam. The beam spot 423 is caused to scan the region of the specimen 407 during step 311 so as to allow analytical data to be captured for the entire field of view. The emitted particles typically include backscattered electrons, secondary electrons, and X-rays. At steps 313 and 315 secondary electrons and X-rays of the emitted particles are concurrently monitored by an electron detector (not shown), a first X-ray detector 408, and a second X-ray detector 409. As the electron beam (not shown) is caused to scan across the region, causing X-rays and electrons to be emitted from a plurality of locations within the field of view region of the specimen, the X-rays and electrons are obtained at the same time, so as to allow both types of analytical data to be visualised live, in real time. At step 313 the electron data is used to obtain a first image frame. Pixels of that first image frame correspond to the aforementioned locations in the region of the specimen, that is the sampling locations from which electron and X-ray signals are captured as the beam is caused to impinge thereon.

Correspondingly, at least one second image frame is obtained at step 315, each second image frame visualising X-ray signals derived from X-rays emitted from the plurality of sampling locations.

Step 315 involves the use of a criterion to derive the content of the second image frame in order for the data acquired by the first and second X-ray detectors 408, 409 to be optimised, based on the signal collection capabilities of the X-ray detection arrangement. It can be seen that the collection solid angle of the second X-ray detector 409 is smaller than that of the first X-ray detector 408. In the present example, the second X-ray detector 409 is a conventional EDS detector, mounted on a side port of a scanning electron microscope. The limited solid angle subtended by the area of that detector at the beam spot limits the signal-to-noise ratio (S/N) for the X-ray signals derived from that sensor. However, the first X-ray detector 408 is mounted below the polepiece 422 of the electron lens, and has sensors surrounding the incident electron beam and sensing areas facing the specimen, and is therefore capable of achieving a considerably higher total collection solid angle for all of its sensors, compared with the second detector 409. In this way the first X-ray detector 408 can achieve a higher S/N. However, as noted above, owing to the sensitivity of the X-ray detector segments to high-energy backscattered electrons, each of the first and second X-ray detectors is provided with an arrangement for reducing the incidence of electrons on the sensor element or regions thereof. The positioning of the second X-ray detector 409 permits the inclusion of an electron trap, in the present example a pair of permanent magnets, that generates a strong magnetic field capable of diverting substantially all backscattered electrons travelling towards the detector away from its sensor areas. Conversely, the placement of the first X-ray detector 408 between the polepiece 422 and the specimen 407 leaves insufficient space for an electromagnetic electron deflection device, and so the first X-ray detector 408 is provided with a layer of filter material disposed over the surface of the sensor area that faces the specimen 407. The filter material in front of the first detector 408 blocks backscattered electrons. The filter additionally blocks secondary electrons, although these typically have lower energies. However, the filter material additionally affects X-rays, and in particular reduces the incidence of lower-energy X-rays on the first detector 408.

Each second image frame generated at step 315, for a given compound image frame being acquired, corresponds to a particular chemical element. The first criterion may be configured and implemented in a number of different ways in order to obtain a second image frame for a given chemical element, preferably so that the S/N is optimised. Generally, the criterion is chosen so that a second image frame representing a chemical element whose characteristic peaks are at the lower end of an X-ray energy spectrum is derived preferentially from the second set of X-rays, that is from data acquired by the second X-ray detector 409, because the first detector generally achieves lower S/N for lower energies. The first criterion is typically configured so that, conversely, for second image frames representing elements with higher-energy characteristic peaks, the pixel values are derived preferentially from the first X-ray detector 408, owing to the large collection solid angle over which the first set of X-rays are collected, and hence the greater S/N. In the various example methods, however, the first criterion is configured in a wide variety of different ways, causing the second image frames to be obtained at step 315 by a variety of different ways of deriving pixel values from the available X-ray data.

The set of electrons and first and second sets of X-rays that are monitored at steps 313 and 315 are emitted from the specimen substantially simultaneously. That is to say, both of the electrons and X-rays that are monitored (by either X-ray detector) are emitted at the same time, as a result of the irradiation of the specimen by the electron beam at step 311. Generally, therefore, the monitoring at steps 313 and 315 is simultaneous also, in the sense that the receipt by the respective detectors of the respective sets of particles is substantially simultaneous. Typically the electron detector and the first and second X-ray detectors monitor respective particles simultaneously for each of the plurality of locations, meaning, preferably for the duration of the dwell time for which the electron beam is caused to focus on each sampling point. The simultaneity in such embodiments can therefore be understood as meaning that the monitoring is performed within a certain time frame, that time frame being concurrent with and/or in the order of the dwell time.

Once the first image frame representative of the monitored electron signal, and the one or more second image frames, each representing the monitored X-ray signal for a respective chemical element, are acquired, those frames are combined at step 316 so as to produce the compound image frame. That frame is then displayed, at step 317, as part of a real-time updating stream, video, or sequence of frames, on a visual display, thereby facilitating analysis of the specimen. Steps 311-317 are then repeated, for each compound image frame, so as to acquire a time series of compound image frames.

A first example system is shown in part in FIG. 5. The depicted section of the example system 520 comprises a retractable side arm 524 supporting a downward-facing X-ray detector module 508 adapted to be positioned under the microscope polepiece in use, and a second X-ray detector 509 provided with an integral electron trap 512. The second X-ray detector 509 is mounted in the arm 524 so that it has an unobscured line of sight to the probe spot on the specimen 507 on which the electron beam 510 is incident. The arm 524 additionally provides electrical connections (not shown) and a cooling path to an external heat sink (not shown). This first example system further comprises a control module (not shown) configured to acquire a compound image frame series using the X-ray detectors 508, 509, and an electron detector of the electron microscope. The control module may comprise or be comprised by a computing device, and may comprise one or more processors adapted to carry out the described method steps, and/or to control the described components to carry out the respective parts of the method, and comprises the necessary electrical and data connections for doing so.

The electron trap 512 may comprise one or more pairs of permanent magnets, or a circular Halbach magnet array, and is adapted to generate a strong field for diverting backscattered electrons that would be incident on the second detector 509 away therefrom. The trap further includes a soft iron enclosure to limit the stray magnetic field so that it does not interfere with the focusing objects of the electron microscope (see for example U.S. Pat. No. 8,049,182 B2). The second X-ray detector 509 has considerably greater sensitivity to low-energy X-rays than the sensor elements in the first X-ray detector 508 in the module adapted to be used below the microscope polepiece, which requires a material filter to block backscattered electrons.

An advantage of the present example, in which the second X-ray detector 509 is mounted to the support arm 524 is that only a single electron microscope port is required, and the conduits in the arm can accommodate the electrical and cooling requirements for both of the X-ray detectors 508.

The electron detector of the electron microscope is not shown in the present example, but may be positioned at a suitable location within the instrument as is known in the art.

Figure 6:
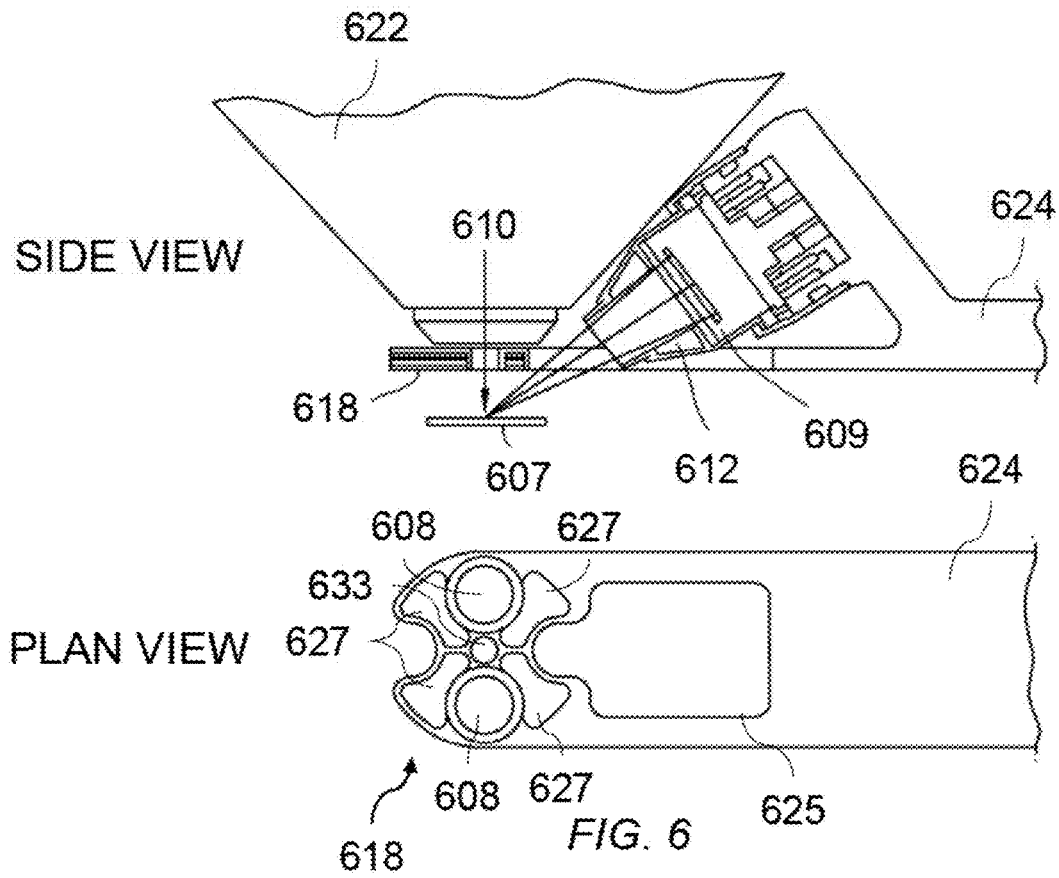
FIG. 6 shows a side view and a plan view of system components shown in FIG. 5, including a first example detector module forming part of the first example system, in position beneath a final lens polepiece of a scanning electron microscope.

FIG. 6 shows a side view and a plan view of the system components shown in FIG. 5, in position beneath the final lens polepiece 622 of a scanning electron microscope, with the detector module 618 comprising the first X-ray detector 608 being visible in the latter. The second detector 609 being mounted in a fixed position relative to the other components of the arm, which may be thought of as a detector module comprised by the system, allows the geometry of the components to be configured so as to ensure that all detectors have a clear line of sight of the probe spot on the specimen 607. The line of sight for the second detector 609 is provided through the aperture 625 in the arm 624.

In this configuration the aperture 625 is provided as a symmetrical cut-out, located so as to retain two-fold rotational symmetry for the plurality of sensors comprised by the detector module 618. In the present example, the detector module 618 comprises the first X-ray sensor 608, which is provided as two distinct sensor elements, in addition to four backscattered electron sensor elements 627 with a symmetrical arrangement.

Figure 7:
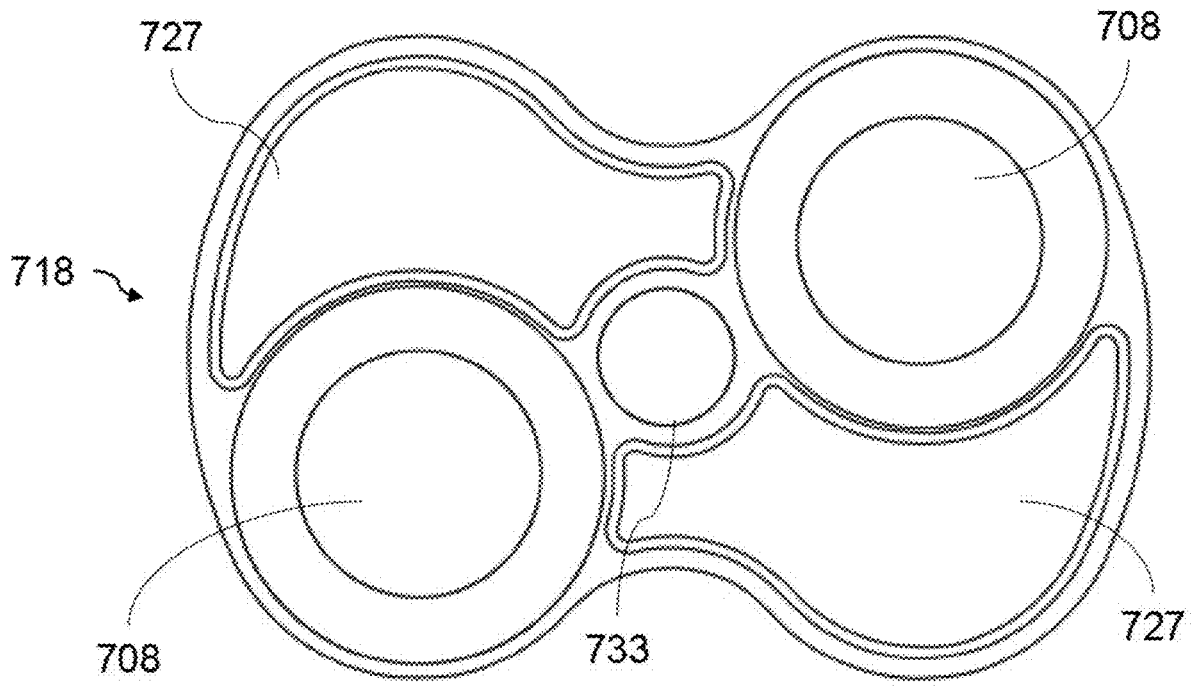
FIG. 7 is a plan view of a second example detector module that may form part of example systems according to the invention.

A second example detector module that may form part of example systems according to the invention is shown in plan view in FIG. 7. The module comprises two circular X-ray sensors comprised by the first X-ray detector 708, in the form of silicon drift detectors, and two backscattered electron sensor segments 727 with two-fold rotational symmetry. The external boundary of the approximately oval-shaped module is configured to provide two regions where the radial distance from the electron beam 610 axis to the outer periphery is reduced, to reduce occlusion of the second X-ray detector, or any accessory detector, in either direction. With this arrangement, the module, the length of which is 21.2 mm, can accommodate two silicon drift detector sensors to give a total area of 14 mm$^2$ or greater, with a minimum radial distance from the beam axis to the outer periphery of less than 4.5 mm. The central hole 733 in the module is required in this example, and the previously described example shown at FIG. 6, to allow the focused electron beam to travel towards the specimen. After a prolonged use in the electron microscope, contamination material can build up on this aperture 733, and electronic charge may accumulate on the material. If the edge of the hole is too close to the focused electron beam 610 it may distort the beam profile and cause a deterioration in microscope image quality. If the module support arm 624 is inserted from a side port on the electron microscope, the hole must be carefully aligned with the electron beam axis to maximise the distance of the focused electron beam from the side walls of the hole 633, 733. The smaller the hole, the more difficult it is to align. Furthermore, a small fraction of electrons in the incident beam may fall outside of the main focus beam, and constitute a "beam tail" of intensity that extends well beyond the main beam. If some of this beam tail falls on the side of the aperture, it may exacerbate contamination build-up. Therefore, it is beneficial to provide as large a central hole 733 as possible, so as to minimise these potential issues. However, if the sensor elements in the module 718 are positioned further away from the access to accommodate this, the solid angles subtended at the specimen beam spot are reduced, and so a compromise is involved. It has been found that the internal diameter of the central hole may optimally be at least 1.5 mm and preferably more than 2.5 mm in order to avoid these effects in most scanning electron microscopes.

An additional advantage of having an X-ray sensor 708 below the polepiece is that it can detect X-rays that are emitted from material that is not visible to a side-mounted accessory detector, for example for specimens with rough or angled surfaces, where the focused electron beam may strike material at a depression. X-rays emitted from the probe spot can reach any part of the first X-ray detector to which a line of sight exists, and not obscured by the side wall of the depression. Therefore, it is desirable to have as much active area of a sensor as possible within a small radial distance from the electron beam axis. If the surface of the sensor is at a distance 6 mm from the probe spot on the specimen then X-rays emitted at an elevation θ of 45° with respect to the horizontal would strike the sensor at radial distance 6 mm from the axis. It is desirable to have at least half the total active area of the X-ray sensors within 6 mm of the axis to provide some analysis capability for material at the base of depressions.

It is advantageous to provide the BSE sensor elements 727 in the module with at least two-fold rotational symmetry about the focused beam axis for the arrangement reduces the effects of topography on the total BSE signal, so that it is more representative of material composition rather than the local orientation of the surface. It is also beneficial for the first X-ray detector sensor elements to be symmetrically disposed about the focused beam axis, particularly when viewing specimens with high surface topography. If the incident electron beam is striking an object at the base of a "cliff", the cliff itself may obstruct the passage of X-rays to one of the first X-ray detector sensor elements. However, if the other X-ray sensor element is diametrically opposite, it may still have a clear view of the object so that X-ray emissions from the object can be detected. Furthermore, for specimens where the local surface is flat and both of the first X-ray detector sensor elements have a clear view of the probe spot, the emitted X-rays will be subject to so-called "matrix" effects, such as specimen self-absorption, that depend on the surface orientation. If the surface is tilted from the horizontal, and the first X-ray detector sensor elements have two-fold rotational symmetry about the focused electron beam axis, then averaging the signals from the two sensors will reduce the influence of surface tilt on the matrix effects.

Although the two-fold rotational symmetry of the sensors is helpful to reduce topography effects, the overall response of the sensors to excited signals will change when the incident electron beam is deflected to different positions on the specimen surface. When the focused electron beam is deflected to an off-axis position on the specimen, the collection solid angle for electrons or X-rays is larger for the sensor that is closer to the beam position on the specimen. For positions along a line between both sensors projected on to the specimen surface, the increase in collection solid angle for one sensor is approximately compensated by the reduction in solid angle for the opposite sensor. However, for beam positions in a perpendicular direction to this line, as the distance from the central axis increases, the collection solid angle falls for both sensors.

The higher the SEM magnification, the smaller will be the maximum scan deflection on the specimen to cover the field of view and the smaller will be any change in efficiency in signal detection at different positions within the field of view. However, for a typical SEM at a fairly low magnification of 200×, the width of the field of view will be about 1.5 mm and for the design shown in FIG. 7 for example, the variation in collection solid angle with position can result in a few percent variation in response over the field of view. The BSE signal can differentiate materials of different composition and signal thresholds can therefore be defined to delineate regions of different materials within the field of view but when the average atomic number of the materials are similar, any spatial variation in signal collection efficiency will make this delineation unreliable. Therefore, the extent of this non-uniformity of response is particularly important for the BSE signal. The physics of BSE emission is well known and can be simulated by Monte Carlo techniques so that the distribution of backscattered electrons as a function of both angle and energy can be predicted. When the beam position is at top left or bottom right of the field of view, it is closest to one or other of the two BSE sensors and the sum response is 3.3% greater than when the position is on the central axis. When the beam position is top right or bottom left, it is further away from both sensors and the sum response is 3% less than for the central position.

For applications where this non-uniformity of response for large fields of view is unacceptable, the conventional solution would be to use a full disk or a 4-fold symmetric segmented BSE detector. However, this would entail moving the SDD X-ray sensors further away from the beam axis and compromising the collection solid angle for X-ray detection. The alternative approach of putting a ring of BSE sensors outside the X-ray sensors would reduce the BSE signal per unit area of sensor because it is well known that the intensity of BSE electrons decreases approximately as the Cosine of the angle of emission with the normal to the surface. Increasing the diameter of the module to improve either the BSE or the X-ray sensitivity would increase the chance of obstructing other equipment in the SEM chamber or the line of sight of a detector mounted to one side. To avoid these compromises, example systems according to the invention advantageously achieve a more uniform BSE response over a large field of view for an oval module that only has two-fold rotational symmetry that is exemplified by the module shown in FIG. 8, the length of which is 26.5 mm.

Figure 8:
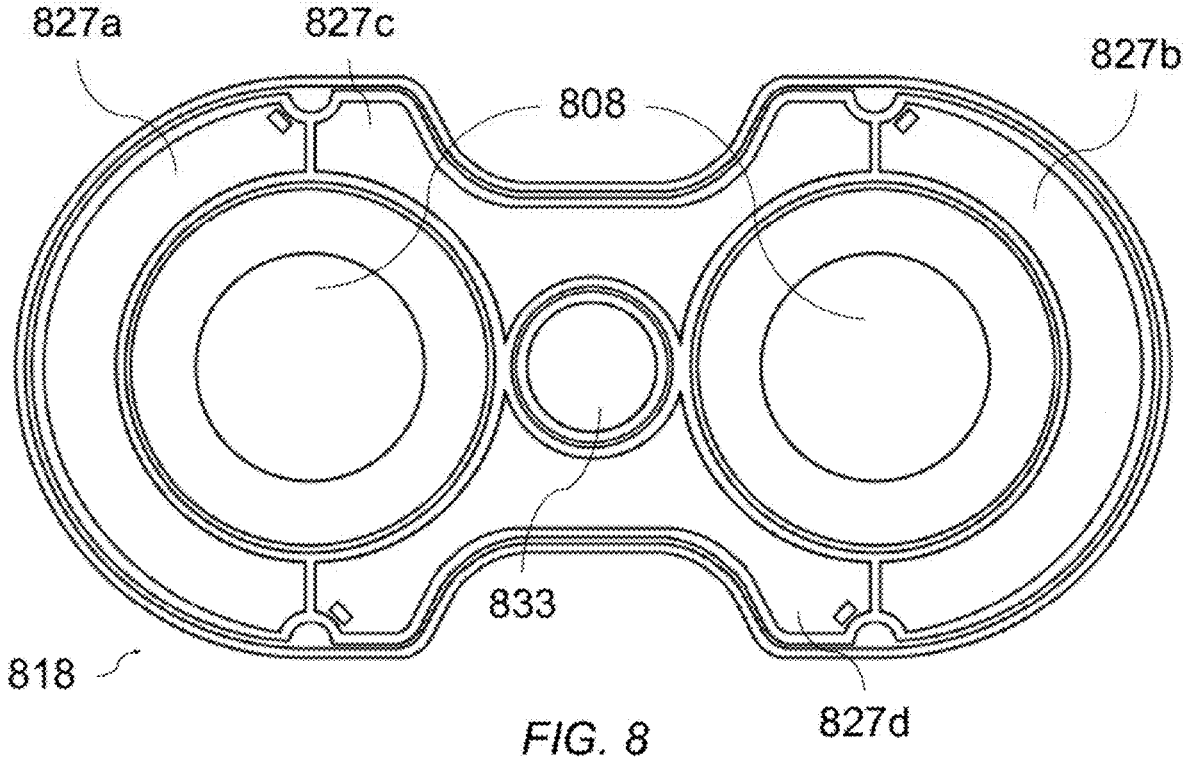
FIG. 8 is a plan view of a third example detector module that may form part of example systems according to the invention.

FIG. 8 shows, in plan view, a third example detector module that may form part of example systems according to the invention. The module 818 comprises two circular X-ray sensor elements to form the first X-ray detector 808, either side of a central hole 833, and four backscattered electron sensor segments 827a, 827b, 827c, 827d, with two-fold rotational symmetry.

The BSE sensor elements 827c and 827d are closest to the central axis and are therefore most efficient for detecting BSE electrons. The summed response for sensors 827c and 827d would show non-uniformity over a large field of view where the weakest response would be at the farthest ends of a line perpendicular to the vertical line joining the sensors. The additional BSE sensors 827a and 827b on the outside of the SDD X-ray sensors 808 help compensate for this drop in sensitivity. Consequently, when the BSE response for the sum of all the sensors is calculated for the module with dimensions of FIG. 8 where the entrance surface of the BSE sensors is again positioned 5.8 mm above the surface of the specimen, the uniformity of response over a 1.5 mm square area on the specimen is improved. Here the maximum response is only 0.2% greater than at the central position and the minimum response is only 0.7% less.

The uniformity of total BSE response can be improved still further by increasing the size of BSE sensors 827a and 827b to compensate for the reduction in efficiency compared to sensors 827c and 827d due to the Cosine emission response. However, the change required to improve uniformity would necessarily increase the length of the module and this would increase the chance of obstruction of other devices within the SEM chamber. Instead of increasing the diameter, the response of BSE sensors 827a and 827b can be amplified by electronic, digital or software computation methods to compensate for the loss of signal due to the Cosine emission response. For the module in FIG. 8, if amplification is used to give a result that is equivalent to the sum response for sensors 1 and 2 added to 3.3 times the sum response for sensors 827*a* and 827*b*, the minimum is the same as in the central position and the maximum response is only 0.2% greater.

Although the uniformity is improved with this amplification of the signals from sensors 827*a* and 827*b*, the noise in that part of the signal is also amplified. The minimum noise is fundamentally limited by the flux of electrons hitting the sensor and the smaller the sensor, the bigger the noise. Therefore, the larger the amplification factor, the more the noise in the overall response will be increased so there is a trade-off between improved uniformity of response with beam position and a reduction in signal-to-noise of the overall response. It would be possible to break the BSE sensor into more segments and apply different levels of amplification before summing the signals to further improve the uniformity of spatial response.

Figure 9:
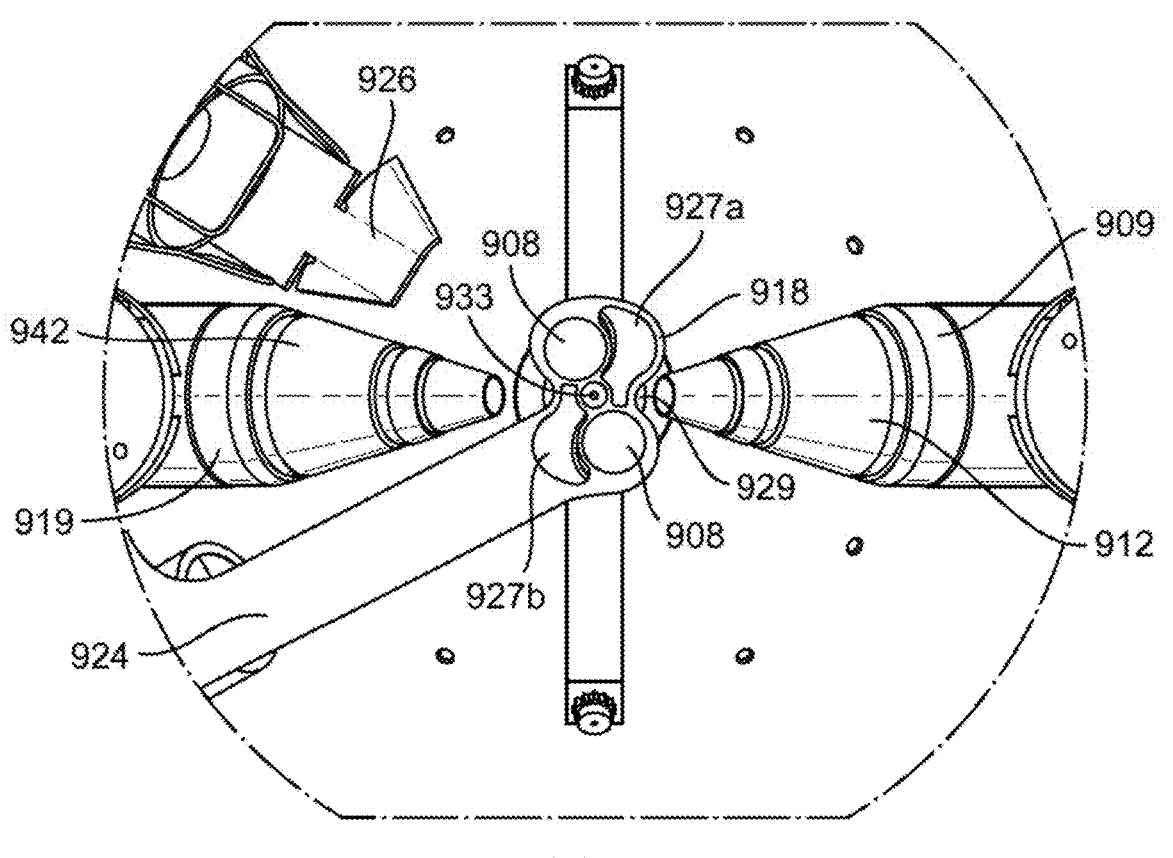
FIG. 9 is a view from below of an example arrangement for carrying out an example method according to the invention, in a scanning electron microscope, including the first example module shown in FIG. 7.

An example of an advantageous implementation according to the invention is shown at FIG. 9, which depicts a view from below of an example arrangement for carrying out a method according to the invention, in a scanning electron microscope including a module as shown in FIG. 7. The sub-polepiece detector module 918 is shown from below, that is from the direction of the specimen (not shown) and is provided on a support arm 924. The module 918 includes a first X-ray detector 908 comprising two circular sensor elements and two backscattered electrons sensor elements 927*a*, 927*b*. The module is shaped with a cut-out geometry for side-mounted detectors. In the present example, a second X-ray detector, provided as a conventional, side-mounted detector 909 is shown, and comprises an electron trap 912. The second X-ray detector 909 is provided with a line-of-sight to the specimen (not shown) by the cut-out 929 portion of the detector module 918. The module 918 also comprises a central hole 933 so that the focused electron beam (not shown) may pass therethrough from the beam assembly to the specimen. The arrangement further comprises a secondary electron detector 926 mounted to the side of the instrument.

Figure 10:
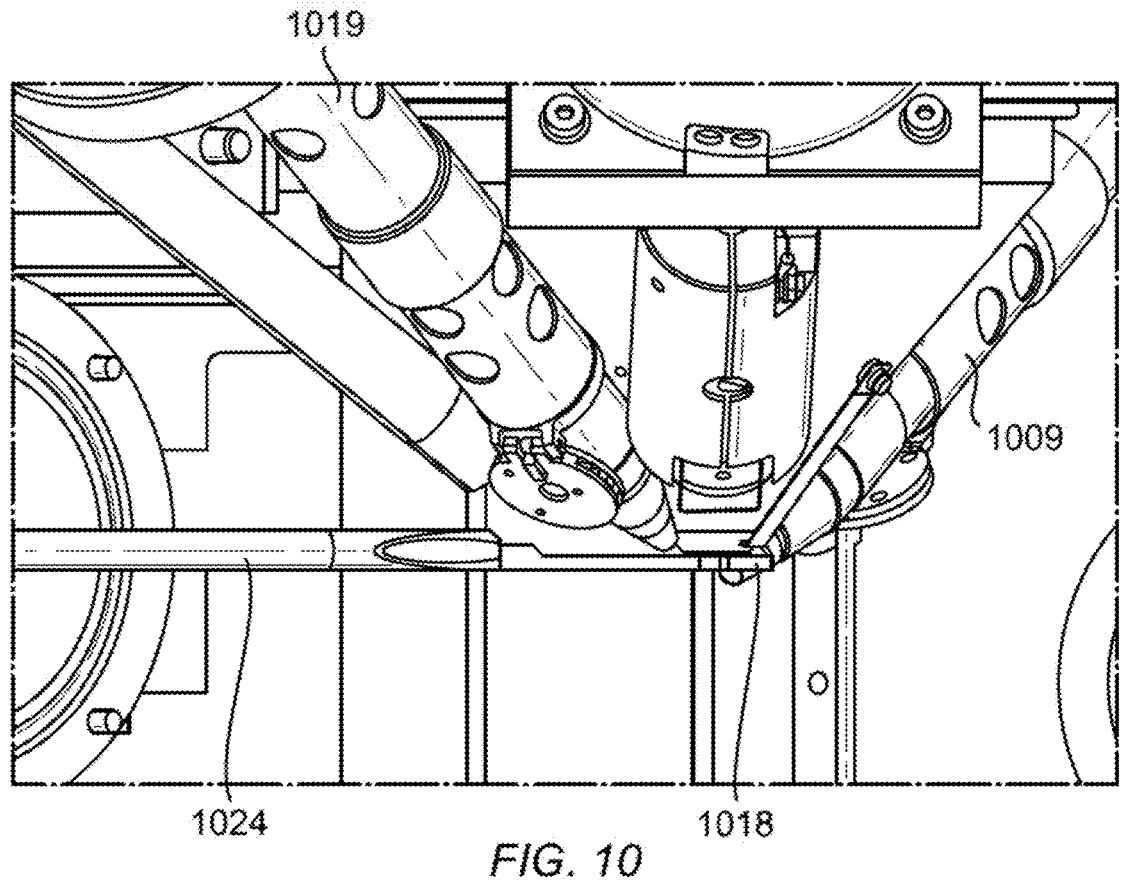
FIG. 10 is a side view of the arrangement shown in FIG. 9.

Additionally the apparatus according to the present example comprises a further X-ray detector 919 similar to the second X-ray detector and arranged at the opposite side of the instrument thereto. FIG. 10 shows a side view of the apparatus. The further X-ray detector provides a further improvement to the X-ray signal that may be monitored by the system, and may be considered part of the second X-ray detector, in that is comprises additional X-ray sensor active area, signals and data from which may be processed together with those from the second X-ray detector.

The two X-ray sensor elements of the first X-ray detector, and two backscattered sensor elements, are arranged symmetrically around an aperture which allows the electron beam from the electron source to be focused by the electron optic column onto the sample. The symmetrical arrangement of sensors is designed so the intensity of the signals are independent of the geometry of the detectors. The retractable arm 924 supporting the sub-polepiece sensor arrangement provides the cooling of the sensor head through a TEC with a heat pipe for heat removal to an external heat sink. The arm also provides the electric connections, for power, control and signal out to external preamplification circuits. The shape of the arm 924 is designed so that its lower extremity is level with the bottom of the sensor head, as shown in FIG. 10. This means that, provided all specimens in the microscope chamber are mounted below the height of the module head, there can be no impact with the detector when samples are moved around by a motorised X-Y stage controlled by the operator. The arm is retracted and inserted by an external motor, which moves the detector from its in-use position below the polepiece to a position when not in use that is entirely outside the wall of the microscope vacuum chamber. This allows the microscope to be used at conditions outside those in which the filter will protect the X-ray sensors from backscatter electrons, or in situations where the apparatus is not required, for example when shorter working distance is used.

The present example is advantageously provided with an interlock configured to control the position and movement of components of the system. In the present case, because the arm 1024 is arranged such that it retracts away from the direction of the second detector 1009, no collision would occur between the arm and the detector even if 1009 were not moved. However, in alternative arrangements the alignment may be different, such that the components could collide when moved. For example, in an alternative arrangement wherein the second X-ray detector 1009 protrudes below the height of the upper surface of the sub-pole piece module 1018, a collision with that detector would result during insertion or retraction, in the absence of an interlock. In that case, the interlock of the present example will operate retract that detector 1009 before moving the arm 1024.

the downward-protruding detector 1009 is automatically retracted by interlock software controlling one or more motors or actuators for positioning system components, before the arm of the sub pole piece detector is retracted, to avoid any potential collision.

In front of the X-ray sensors is a filter designed to stop the vast majority of backscatter electrons up to 20 keV in energy, allowing a beam energy of 20 kV to be used when using the apparatus. Using this filter, X-rays higher than 1 keV in energy can be detected, as described in WO 2022/008924 A1.

The electron traps 912, 942 provided with the two side-mounted conventional EDS detectors 909, 919 are adapted to block backscatter electrons up to the maximum energy of the electron gun (normally 30 keV). The cut-outs give full line of sight to an X-ray sensor up to 150 mm² in size, when working at a design working distance of 8.5 mm below the polepiece.

The secondary electron detector 926 is provided for detecting secondary elements emitted by the sample during electron bombardment. A biased collection grid in front of this detector means that direct line-of-sight to the sample is not required.

Using this example system, secondary electrons, backscattered electrons, and X-rays can be collected at the same time.

The signals from the detectors are routed through pre-amplifiers in the detector bodies outside the vacuum chamber. The electron and X-ray signals are then routed into a signal pulse processor, processing up to four signals (two sub-pole piece sensors and up to two conventional EDS detectors). The electron signals are processed separately.

Figure 12:
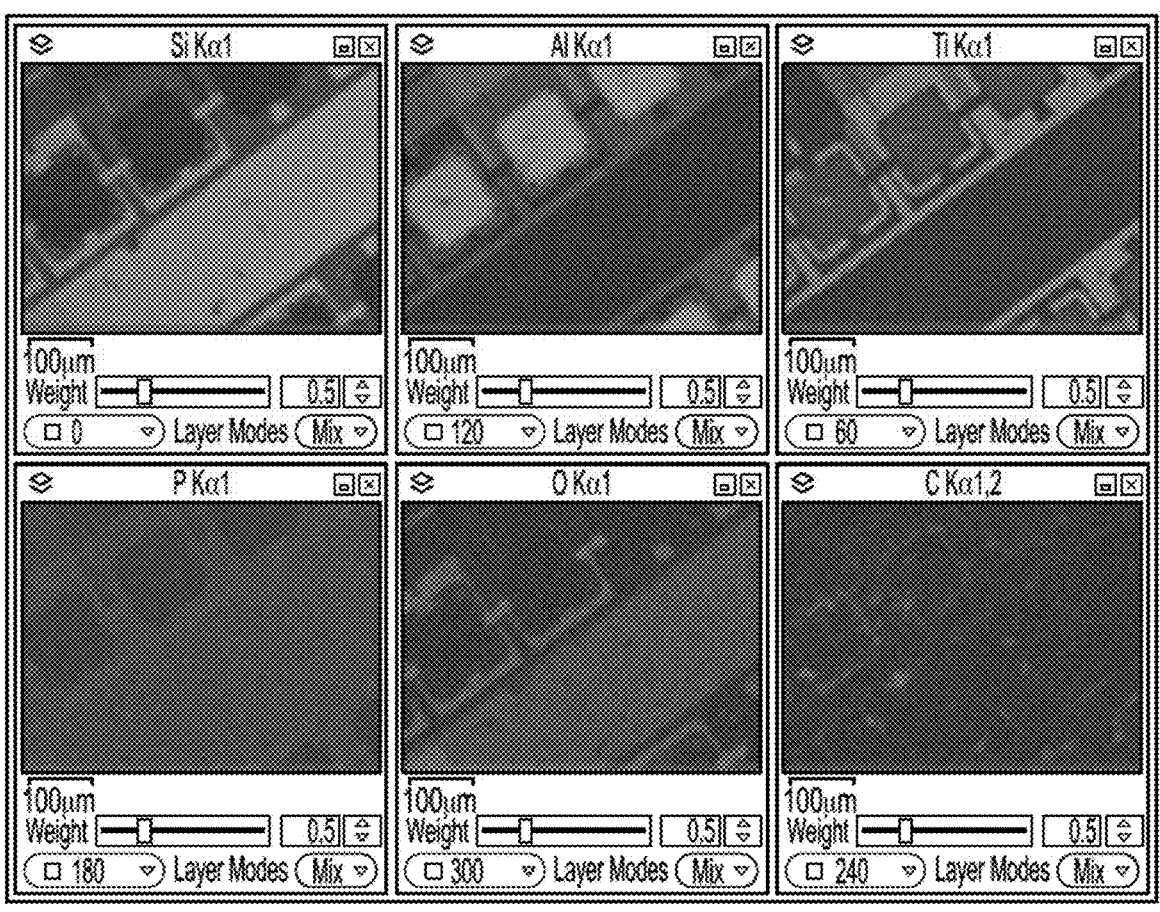
FIG. 12 shows a user interface displaying example X-ray image frames corresponding to the same microscope field of view as FIG. 11, obtained by an example method according to the invention.
Figure 13:
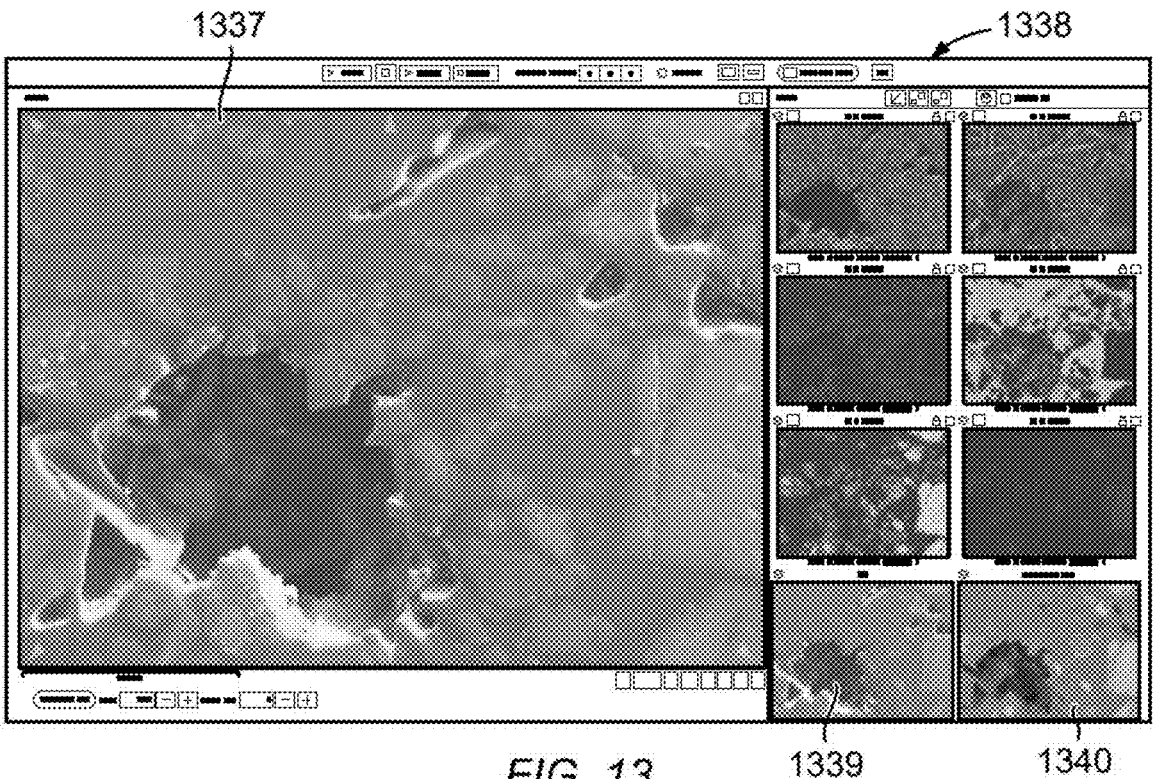
FIG. 13 shows a user interface displaying an example compound image frame obtained by an example method according to the invention.

In this example, image frames acquired during the method are presented on a visual display within a graphical computer-user interface. Portions of the guided user interface are shown in FIGS. 11-13.

As the electron beam is scanned over a field of view of the sample as in step 311, the X-ray spectrum for each channel and the electron intensity is stored for each pixel. The spectra from the sub-pole piece X-ray sensor elements are summed into a single spectrum. An image is built up by showing the signal intensity at each pixel for an electron signal, or an element. The element intensity is calculated by counting all the X-ray counts in a chosen energy range corresponding to an X-ray line characterizing that element.

In normal operation up to two first image frames, that is electron image frames, and a number of second image frames, that is element image frames, are displayed simultaneously. The electron images come from the secondary electron detector 1026 and the combined signal from the two electron sensor elements in the sub-polepiece head 1018.

Figure 11:
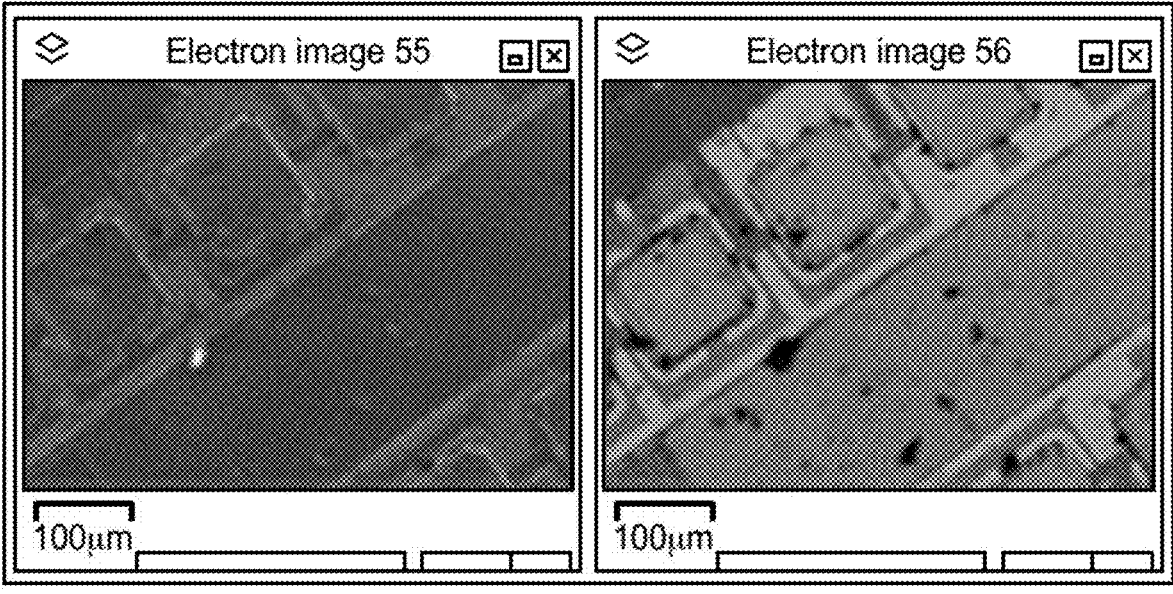
FIG. 11 shows a user interface displaying example electron image frames obtained by an example method according to the invention.

Example electron image frames are shown in FIG. 11. The left frame in the figure shows an image from the secondary electron detector, and the right frame shows that from the backscatter sensor elements in the below-polepiece detector.

The elements to be displayed are determined by an automatic peak identification routine. This takes the spectrum which is the sum of all the pixels in a field of view (sum spectrum) from the side-mounted conventional detector 1009 to form an element list.

For each frame any new elements identified can be added to the element list, and any element previously detected, for example in a previously visited microscope field of view, that is no longer detected, can be removed.

Second image frames, that is element images, are displayed for each element in the list. The second image frame is formed from data either provided by the summed under polepiece sensors or from the side-mounted conventional detector(s), depending on the choosing the highest signal intensity for each element. This will change depending on the relative solid angle of the sensors, but, for the present example equipment, data for elements characterized by lines with energies greater than 1.2 keV (because the filter used in this example increasingly attenuates X-rays with energies below 1.2 keV) will be derived from the first, below-polepiece detector in the module 1018, and image frames for elements with spectral lines less than 1.2 keV will use data from the conventional detectors 1009, 1019.

FIG. 12 shows example X-ray images of second image frames depicting the same field of view as the electron images in FIG. 11. The X-ray image frames displayed, CKa1-2 and O Ka1, are calculated from X-rays less than 1.2 keV in energy so are calculated from data obtained by the side-mounted second detector 909 and further detector 919 and. SiKa1, AlKa1, TIKa1 and PKa1 are calculated from X-rays greater than 1.2 keV in energy, and so are calculated from the sub-polepiece X-ray detector 908 data.

In the present example, the first criterion is configured such that each second image frame is derived from data that is selected, based on the monitored X-ray energy, from data output by the first X-ray detector 908 and second X-ray detector 909. Implementing the criterion so as to effect a threshold energy value that determines which detector data is to be used in producing a given X-ray element map, is one manner of optimising the quality of the X-ray image data. However, other manners of processing are envisaged, as described earlier in this disclosure.

Moreover, the value for such a threshold may be chosen based on multiple factors that affect the signals monitored by each sensor, and may be specific to a given equipment, sensor components, and/or particular relative arrangement thereof.

The obtained image frames can be combined in a number of ways in order to produce a compound image frame. They may be displayed separately. They can also be displayed as a composite image with an intensity representing pixel values from one image (typically the electron image, that is first image frame) and a hue for each compound image frame pixel being calculated by selecting a different colour for each element image frame, and mixing the hues of these element image frames, together with the intensity of the electron image, to produce a result such as that depicted at FIG. 13. The figure shows a user interface displaying an example compound image frame obtained by example method according to the invention.

The compound image frame comprises a composite image 1337 formed from the secondary electron frame, or first image frame (determining the pixel intensity) and a hue determined based on multiple element maps. Each pixel hue is based on the contribution by a corresponding pixel value of an element-specific second image frame, with a colour being assigned to each one, including Mg (orange), Al (blue), Si (green), Cr (yellow) and Fe (magenta). Additionally, in the present example, the compound image frame comprises individual-element second image frames 1338, including an oxygen element map derived from signal acquired by the second, side-mounted conventional EDS detectors 909, 919 (energy 0.5 keV), and other maps derived from data obtained by the first, sub-polepiece X-ray detector (energy >1.2 keV) 908. Electron images 1339, 1340 from the secondary electron detector 924 and the electron sensors 927 in the sub-polepiece head 918 are also shown.

Example methods and systems described in this disclosure allow the monitoring of simultaneous information from the electrons and the X-rays of all elements present in the specimen. As alluded to above, data therefrom can then be processed and presented on a software interface in a number of different ways. These may be effected by configuring differently the first criterion according to which the pixel values of each second image frame are derived.

The first example approach, as described above may be summarised as: obtaining an electron image frame to show morphology as well as elemental images using the X-ray detector of the first and second X-ray detectors that receives the highest X-ray intensity, or outputs data with the highest signal-to-noise ratio, for that element; and displaying the image frames as juxtaposed frames in a compound image frame, and/or overlaying them, with each element given a different hue and the electron image providing the intensity.

Further ways in which the display may be displayed are as follows.

A second approach may involve X-ray data being processed to remove variations in the X-ray background that may, for example, be due to large differences in the average atomic number. Processing may also be appropriate where signals from two or more elements cannot be separated by the processing methods described above.

This can be summarised as: obtaining electron image frames to show morphology, and elemental images that are processed at each pixel so to remove noise and separate closely occurring peaks, using the detector with the highest X-ray intensity for that element; and displaying the image frames separately and/or overlaying them, with each element given a different hue and the electron image providing the intensity.

A third example approach that can advantageously be employed involves binning the acquired analytical data, by adding pixels together. For example, 2×2 blocks of four pixels may each have their constituent pixels added together. In this way, for example, a 256×256 array of pixels of an image frame may become a 128×128-pixel image frame, with pixels of higher intensity. The element images from the X-ray data may thus have their pixels combined, resulting in lower image resolution than the electron image, but with improved S/N.

An advantageous variation of this approach involves binning element images that are derived from data from the different detectors by different amounts, with the images from the lower-intensity, or lower-S/N, data from the side-entry second X-ray detector 909 being binned to a greater degree. For example, the element images from the side-mounted detector 909 could have 4×4 pixel blocks binned, and the element images from the below-polepiece detector 908 could have 2×2 by pixel blocks binned, so that a greater degree of pixel aggregation, and consequently S/N improvement, at the expense of pixel resolution, is applied to data from the smaller-solid angle, conventional detector 909.

This approach may be summarised as: obtaining electron image frames to show morphology, and X-ray elemental images using the detector with the highest X-ray intensity for that element, with pixels additionally being combined or smoothed to different levels depending on their intensity. In this way, pixels for electron image would have a higher resolution, than those from the sub pole piece detector. Those from the conventional detector would have the lowest intensity, and therefore the highest level of binning. The image frames would again be displayed separately and/or overlayed, with each element given a different hue and the electron image providing the intensity.

In a fourth example approach, for at least some elements it may be advantageous to combine the signals from the two different types of X-ray detectors together, e.g. where the S/N of both detectors is similar and the difference is dominated by the signal level. This can be the case for elements with high energy lines, whereas in previously described approaches, the below-pole piece detector 908 is used as it has the highest intensity.

This fourth approach may be summarised as: Obtain electron images to show morphology and elemental images by way of summing of the intensities from both the first and second detector 908, 909, or from one type of X-ray detector, to maximise intensity and signal-to-noise ratio; displaying the image frames separately and/or overlaying them, with each element given a different hue and the electron image providing the intensity.

A fifth approach involves the addition of the signal from the below-polepiece backscattered electron detector 927 in the below-pole piece detector head 918. If such electron sensors are included in the sub-polepiece module, then backscattered electrons can be detected to form an atomic or material contrast image. This image is advantageous for samples that have been polished and have no topography, such that the amount of useful image detail for the first image frame attributable to signals acquired by the secondary electron detector 926 is low.

The compound image frame may include any one or more of: an electron image indicative showing atomic number contrast, an electron image to show topography, and elemental images using data from the X-ray detector with the highest X-ray intensity for each element. The compound image frames may again be displayed separately and/or overlayed, with each element given a different hue and the electron image providing the intensity.

A sixth example approach involves a post-acquisition mode, wherein the areas of identical composition can be selected either manually or using a phase clustering approach. Spectra from these areas can be calculated by adding up the sum of the pixels in these areas. Using the conventional detector 909 will be advantageous because of its better spectral resolution. Furthermore also the quantitative algorithms for determining the composition of these areas are well established. This is a variation in the approach described in WO 2022/008924 A1. However, in this case composition is determined rather than new element images being created. This approach may be summarised as: Pixels of same chemistry identified from the X-ray images being summed to form a spectrum. The summed spectrum from each phase from the side entry detector can be used to determine composition.

The invention may be further understood by reference to the following numbered clauses:

Clause 1. An analyser system in an electron microscope, Said electron microscope comprising an electron detector for detecting secondary electrons or backscattered electrons said analyser system comprising a first detector module disposed between a beam source and the specimen, the first detector module having one or more X-ray sensor portions facing the specimen and at least partly surrounding the incident charged particle beam, and filter(s) between the sample and X-ray sensor(s)

a second detector module comprising an x-ray sensor and an electron trap a control section for controlling the electron microscope system, the first and second detector modules an elemental analyser for performing elemental analysis based on an output signal from the first and second detector modules an image display section displaying one or more compound images using the first detector module in combination with an electron detector, the image display section displaying the series of compound image frames in real-time on a visual display while the microscope field of view is changing Clause 2. An apparatus according to clause 1 where the image display section displays one or more compound images using the first and second detector modules in combination with an electron detector.

Clause 3. apparatus according to clause 2 where the images from the X-ray detectors are binned more according to decreasing levels of intensity.

Clause 4 An apparatus according to clause 1 where the first detector module also comprises one or more electron detectors.

Clause 5. An apparatus according to clause 4, where the image display section displays one or more compound images using the first and second detector modules in combination with an electron detector.

Clause 6. An apparatus according to clause 5 where the images from the X-ray detectors are binned more according to decreasing levels of intensity.

Clause 7. An apparatus according to clause 1, where the two detectors position is known and insertions and retractions of the two detectors are coordinated to avoid collisions.

The invention claimed is:

1. A method for analysing a specimen in a microscope, the method comprising:

acquiring a series of compound image frames using an electron detector, a first X-ray detector, and a second X-ray detector, wherein the first X-ray detector is positioned between the specimen and an electron beam source from which a focused electron beam emerges towards the specimen, and is provided with a filter member interposed between the first X-ray detector and the specimen and adapted to reduce the incidence of electrons on the first X-ray detector, wherein the second X-ray detector is provided with a deflector arrangement configured to reduce the incidence of electrons on the second X-ray detector, and wherein acquiring a compound image frame comprises:

a) causing the focused electron beam to traverse a region of the specimen;

b) monitoring a set of resulting electrons emitted from a plurality of locations within the region of the specimen, using the electron detector, so as to obtain a first image frame, the first image frame comprising a plurality of pixels corresponding to, and having values derived from the monitored electrons emitted from, the plurality of locations;

c) monitoring first and second sets of resulting X-rays emitted from the plurality of locations using the first X-ray detector and the second X-ray detector respectively, so as to obtain one or more second image frames, each comprising a plurality of pixels corresponding to the plurality of locations and having values derived, in accordance with a first criterion, from monitored X-rays characteristic of a respective chemical element and emitted from the plurality of locations, wherein the set of electrons and the first and second sets of X-rays are emitted from the specimen substantially simultaneously; and d) combining the first image frame and the one or more second image frames so as to produce the compound image frame, such that the compound image frame provides data derived from monitored electrons and X-rays emitted from the plurality of locations within the region, and displaying the series of compound image frames on a visual display, wherein the visual display is updated to show each compound image frame in sequence.

2. A method according to claim 1, wherein for each of the one or more second image frames:

a respective first criterion is configured in accordance with the respective chemical element, and the values of the plurality of pixels comprised by the second image frame are derived in accordance with the respective first criterion.

3. A method according to claim 1, wherein the first criterion is configured such that step (c) further comprises, obtaining summed data by summing data representative of the first set of monitored X-rays with data representative of the second set of monitored X-rays, and such that the values of the pixels of each of the one or more second image frames are obtained from the summed data.

4. A method according to claim 1, wherein the first criterion is configured such that, for each of the one or more second image frames, the deriving of the pixel values in accordance with the first criterion comprises processing data obtained from each of the first and second X-ray detectors so as to obtain first and second value sets representative of the respective chemical element, and wherein the pixel values are obtained from the first and second value sets.

5. A method according to claim 4, wherein the obtaining of the pixel values comprises any one or more of: summing the first and second value sets; obtaining the pixel values from a selected one of the first and second value sets; and combining the first and second value sets according to a weighted function.

6. A method according to claim 1, wherein the first criterion is based on at least one of first and second signal-to-noise parameters that are representative of a signal-to-noise ratio of each of first X-ray data derived from the first set of monitored X-rays and second X-ray data derived from the second set of monitored X-rays respectively, wherein the first criterion is based on a comparison of the first and second signal-to-noise parameters such that, for a second image frame, the pixel values are derived preferentially from X-ray data, of the first data and second data, having a higher signal-to-noise ratio for the respective chemical element.

7. A method according to claim 1, wherein the first criterion is configured such that, for each second image frame, pixel values are derived in accordance with an intensity of a signal output by each of the first and second X-ray detectors for X-rays characteristic of the chemical element corresponding to the second image frame.

8. A method according to claim 1, wherein the method further comprises populating, based on the second set of X-rays monitored during the acquiring of at least one of the series of compound image frames, a set of identified chemical elements, and wherein, during the acquiring of the at least one of the series of compound image frames, step (c) comprises obtaining a respective second image frame for each chemical element of the set of identified chemical elements.

9. A method according to claim 1, wherein the acquiring a compound image frame further comprises, for at least one of the one or more second image frames, and in accordance with an aggregation criterion:

for each of one or more subsets of the pixels in the second image frame, combining the values of the pixels in the subset, so as to obtain one or more respective aggregate pixel values, and replacing each of the one or more subsets of pixels in the second image frame with an aggregate pixel having a value equal to the respective aggregate pixel value, wherein the aggregation criterion is configured in dependence on the X-ray detector used to monitor the X-rays from which the values of the pixels in the second image frame are derived.

10. A method according to claim 9, wherein each of the subsets comprises a number of pixels that is configured in accordance with a signal parameter value corresponding to the respective monitored X-rays from which the pixel values are derived.

11. A method according to claim 10, wherein the signal parameter is configured in accordance with the set of monitored X-rays from which the pixel values are derived, such that the said number of pixels is greater for a second image frame whose pixel values are derived from X-rays comprised by the second set of monitored X-rays than for a second image frame whose pixel values are derived from X-rays comprised by the first set of monitored X-rays.

12. A method according to claim 10, wherein the signal parameter is configured such that the said number of pixels is dependent on a solid angle subtended by a total sensor area of the one of the first and second X-ray detectors used to monitor the X-rays from which the pixel values of the second image frame are derived at a location at which the electron beam strikes the specimen.

13. A method according to claim 12, wherein the signal parameter is configured such that the said number of pixels is greater for smaller solid angles and smaller for larger solid angles.

14. A method according to claim 1, wherein step (c) comprises obtaining at least two second image frames, wherein:

at least one of the second image frames comprises a plurality of pixels corresponding to the plurality of locations and having values derived, in accordance with the first criterion, from monitored X-rays comprised by the first set and characteristic of a respective chemical element and emitted from the plurality of locations, and at least one other of the second image frames comprises a plurality of pixels corresponding to the plurality of locations and having values derived, in accordance with the first criterion, from monitored X-rays comprised by the second set and characteristic of a respective chemical element and emitted from the plurality of locations.

15. A method according to claim 1, wherein the method further comprises defining a set of chemical elements for at least a portion of the series of compound image frames corresponding to a set of spectral peaks identified in accordance with either or both of the first and second sets of X-rays monitored during acquiring the portion of the series, and wherein step (c) of acquiring a compound image frame comprises obtaining a respective second image frame corresponding to each chemical element of the set of chemical elements.

16. A method according to claim 1, wherein step (c) comprises obtaining a plurality of second image frames, and wherein the producing the compound image frame comprises any of: juxtaposing two or more of the second image frames; and overlaying two or more of the second image frames.

17. A system for analysing a specimen in a microscope, the system comprising:

a first X-ray detector adapted to be positioned in use between a specimen and an electron beam source from which a focused electron beam emerges towards the specimen, a filter member provided such that it is interposed in use between the first X-ray detector and the specimen, the filter member being adapted to reduce the incidence of electrons on the first X-ray detector, a second X-ray detector provided with a deflector arrangement adapted to reduce the incidence of electrons on the second X-ray detector in use, a control module configured to acquire a series of compound image frames using an electron detector, the first X-ray detector the second X-ray detector, wherein acquiring a compound image frame comprises:

a) causing the focused electron beam to traverse a region of the specimen;

b) monitoring a set of resulting electrons emitted from a plurality of locations within the region of the specimen, using the electron detector, so as to obtain a first image frame, the first image frame comprising a plurality of pixels corresponding to, and having values derived from the monitored electrons emitted from, the plurality of locations;

c) monitoring first and second sets of resulting X-rays emitted from the plurality of locations using the first X-ray detector and the second X-ray detector respectively, so as to obtain one or more second image frames, each comprising a plurality of pixels corresponding to the plurality of locations and having values derived, in accordance with a first criterion, from monitored X-rays characteristic of a respective chemical element and emitted from the plurality of locations, wherein the set of electrons and the first and second sets of X-rays are emitted from the specimen substantially simultaneously; and d) combining the first image frame and the one or more second image frames so as to produce the compound image frame, such that the compound image frame provides data derived from monitored electrons and X-rays emitted from the plurality of locations within the region, and a display module configured to display the series of compound image frames on a visual display, wherein the visual display is updated to show each compound image frame in sequence.

18. A system according to claim 17, wherein the deflector arrangement comprises a magnet arrangement for generating a magnetic field to deflect electrons away from the second X-ray detector, and wherein the magnet arrangement comprises any one or more of a permanent magnet proximal to the second X-ray detector, an electromagnet proximal to the second X-ray detector, and a magnet of an electron beam assembly of the microscope.

19. A system according to claim 18, wherein the deflector arrangement comprises an electrode arrangement for generating an electric field to deflect electrons away from the second X-ray detector.

20. A non-transitory computer-readable medium storing instructions executable by one or more processors to cause the one or more processors to perform a method according to claim 1.

\* \* \* \* \*